(12) United States Patent
Sato

(10) Patent No.: US 6,891,680 B2
(45) Date of Patent: May 10, 2005

(54) ZOOM LENS SYSTEM

(75) Inventor: Susumu Sato, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 18 days.

(21) Appl. No.: 10/677,285

(22) Filed: Oct. 3, 2003

(65) Prior Publication Data

US 2004/0070844 A1 Apr. 15, 2004

(30) Foreign Application Priority Data

Oct. 4, 2002 (JP) ........................................ 2002-292827
Sep. 17, 2003 (JP) ........................................ 2003-324679

(51) Int. Cl.[7] ........................ G02B 15/167; G02B 27/64
(52) U.S. Cl. ........................................ 359/687; 359/557
(58) Field of Search ............................. 359/687, 554, 359/557, 676, 683–685

(56) References Cited

U.S. PATENT DOCUMENTS

| | | | | |
|---|---|---|---|---|
| 5,721,641 | A | * 2/1998 | Aoki ........................... | 359/557 |
| 6,058,269 | A | * 5/2000 | Tsutsumi ..................... | 396/55 |
| 6,560,016 | B2 | * 5/2003 | Usui et al. .................. | 359/557 |
| 6,646,804 | B2 | * 11/2003 | Harada ........................ | 359/557 |
| 6,693,750 | B2 | * 2/2004 | Sato ............................ | 359/687 |
| 2002/0101661 | A1 | 8/2002 | Harada ........................ | 359/557 |
| 2003/0133200 | A1 | 7/2003 | Sato ............................ | 359/686 |

FOREIGN PATENT DOCUMENTS

| | | |
|---|---|---|
| JP | 10-90599 | 4/1998 |
| JP | 2002-162564 | 6/2002 |

* cited by examiner

*Primary Examiner*—Scott J. Sugarman
*Assistant Examiner*—Deborah A. Raizen
(74) *Attorney, Agent, or Firm*—Miles & Stockbridge P.C.

(57) ABSTRACT

The object is to provide an afocal zoom lens system with the f-number of about 4 or less capable of performing vibration reduction correction. The system includes, in order from an object, a first group G1 being positive, a second group G2 being negative, a third group G3 being positive, and a fourth group G4 being positive. Zooming is performed by moving the second and third groups along the optical axis. The fourth group G4 is composed of a front group G4F being positive, a middle group G4M being negative, and a rear group G4R being positive. Vibration reduction is performed by shifting the middle group G4M perpendicular to the optical axis. The first group G1 consists of a first front group G1f being fixed, a first middle group G1m being movable, and a first rear group G1r being fixed. Focusing is performed by moving G1m along the optical axis.

21 Claims, 21 Drawing Sheets

ZOOM LENS SYSTEM

This application claims the benefit of Japanese Patent applications No. 2002-292827 filed Oct. 4, 2002 and No. 2003-324679 filed Sep. 17, 2003 which are hereby incorporated by reference.

BACKGROUND OF THE INVENTION

1. Field of the Invention

The present invention relates to a zoom lens system having a vibration reduction correction mechanism suitable for single lens reflex cameras and electronic still cameras, in particular, to a large aperture internal focusing telephoto zoom lens system.

2. Related Background Art

Zoom lens systems having a vibration reduction correction mechanism with the f-number of 5.8 or more able to be used for single lens reflex cameras and electronic still cameras have been proposed in Japanese Patent Application Laid-Open No. 10-90599 (page 5, FIG. 7).

However, in the above-disclosed example, the f-number (FNO) in the telephoto end state is very dark having from 5.85 to 8.27, so a fast zoom lens system having the f-number of 4 or less has been demanded.

SUMMARY OF THE INVENTION

The present invention is made in view of the aforementioned problems and has an object to provide a large aperture, internal focusing, telephoto zoom lens system having the FNO of about 4 or less capable of being used as a vibration reduction correction lens with keeping superior optical performance.

According to one aspect of the present invention, a zoom lens system consists of, in order from an object, a first lens group having positive refractive power, a second lens group having negative refractive power, a third lens group having positive refractive power, and a fourth lens group having positive refractive power. Zooming is carried out by moving the second lens group and the third lens group along the optical axis. The first lens group consists of, in order from the object, a front lens group of the first lens group having positive refractive power, a middle lens group of the first lens group having negative refractive power, and a rear lens group of the first lens group having positive refractive power. In the fourth lens group, there are three lens portions with refractive power that are, in order from the object, a front lens group of the fourth lens group having positive refractive power, a middle lens group of the fourth lens group having negative refractive power, and a rear lens group of the fourth lens group having positive refractive power. The front lens group of the first lens group includes two positive lens elements and a negative lens element. The middle lens group of the first lens group includes a positive element and a negative lens element. The rear lens group of the first lens group includes a positive lens element. Focusing to a close object is carried out by moving the middle lens group of the first lens group along the optical axis. The front lens group of the fourth lens group includes a positive element and a negative lens element. The middle lens group of the fourth lens group includes a positive element and two negative lens elements. The rear lens group of the fourth lens group includes a positive lens element and a negative lens element. Imaging position is varied by shifting the middle lens group of the fourth lens group perpendicular to the optical axis. The following conditional expression is satisfied:

$$2.5 < |(F1f \times F1r234t)/(F1m \times \Phi1)| < 5.0$$

where $\Phi1$ denotes the maximum effective diameter of the first lens group, F1f denotes the focal length of the front lens group of the first lens group, F1m denotes the focal length of the middle lens group of the first lens group, F1r234t denotes the combined focal length of the rear lens group of the first lens group, the second lens group, the third lens group, and the fourth lens group in the telephoto end state.

In one preferred embodiment of the present invention, the following conditional expressions are preferably satisfied:

$$2.5 < |(F1f \times F4)/(F1mr23t \times \Phi1)| < 5.0$$

$$2.5 < |(F1 \times F4)/(F23t \times \Phi1)| < 5.0$$

$$2.5 < |(F1f \times F1r \times F4)/(F1m \times F23t \times \Phi1)| < 5.0$$

$$0.7 < |(F4 \times F4m)/(F4f \times F4r)| < 1.3$$

where F1 denotes the focal length of the first lens group, F23t denotes the combined focal length of the second lens group and the third lens group in the telephoto end state, F4 denotes the focal length of the fourth lens group, F1r denotes the focal length of the rear lens group of the first lens group, F1mr23t denotes the combined focal length of the middle lens group of the first lens group, the rear lens group of the first lens group, the second lens group and the third lens group in the telephoto end state, F4f denotes the focal length of the front lens group of the fourth lens group, F4m denotes the focal length of the middle lens group of the fourth lens group, and F4r denotes the focal length of the rear lens group of the fourth lens group.

In one preferred embodiment of the present invention, the following conditional expressions are preferably satisfied:

$$0.025 < |(Ft \times \Phi4f)/(F4 \times \Phi1 \times \Phi4m)| < 0.045$$

$$0.025 < |(F1 \times \Phi4f)/(F23t \times \Phi1 \times \Phi4m)| < 0.045$$

$$0.020 < |(F1f \times \Phi1r)/(F1m \times \Phi1 \times \Phi4m)| < 0.070$$

$$0.025 < |(F1r \times \Phi4f)/(F23t \times \Phi1r \times \Phi4m)| < 0.045$$

where Ft denotes the focal length of the zoom lens system in the telephoto end state, $\Phi1r$ denotes the maximum effective diameter of the rear lens group of the first lens group G1r, $\Phi4f$ denotes the maximum effective diameter of the front lens group of the fourth lens group G4f, and $\Phi4m$ denotes the maximum effective diameter of the middle lens group of the fourth lens group G4m.

In one preferred embodiment of the present invention, the following conditional expression is preferably satisfied:

$$0.0031 < 1/(Nd1r \times F1r) < 0.0039$$

where Nd1r denotes average refractive index of the lens elements in the rear lens group of the first lens group at d-line.

In one preferred embodiment of the present invention, the most object side lens in the front lens group of the first lens group is a negative meniscus lens having a convex surface facing to the object, and the following conditional expression is preferably satisfied:

$$-0.0060 < 1/(NdL11 \times FL11) < -0.00050$$

where FL11 and NdL11 denote the focal length and refractive index at d-line of the negative meniscus lens, respectively.

In one preferred embodiment of the present invention, the front lens group of the fourth lens group consists of two positive lens elements and a negative lens element, and the rear lens group of the fourth lens group consists of two positive lens elements and a negative lens element.

In one preferred embodiment of the present invention, a field stop is arranged between the front lens group of the fourth lens group and the middle lens group of the fourth lens group.

Other features and advantages according to the invention will be readily understood from the detailed description of the preferred embodiment in conjunction with the accompanying drawings.

DESCRIPTION OF THE PREFERRED EMBODIMENTS

Figure 1:
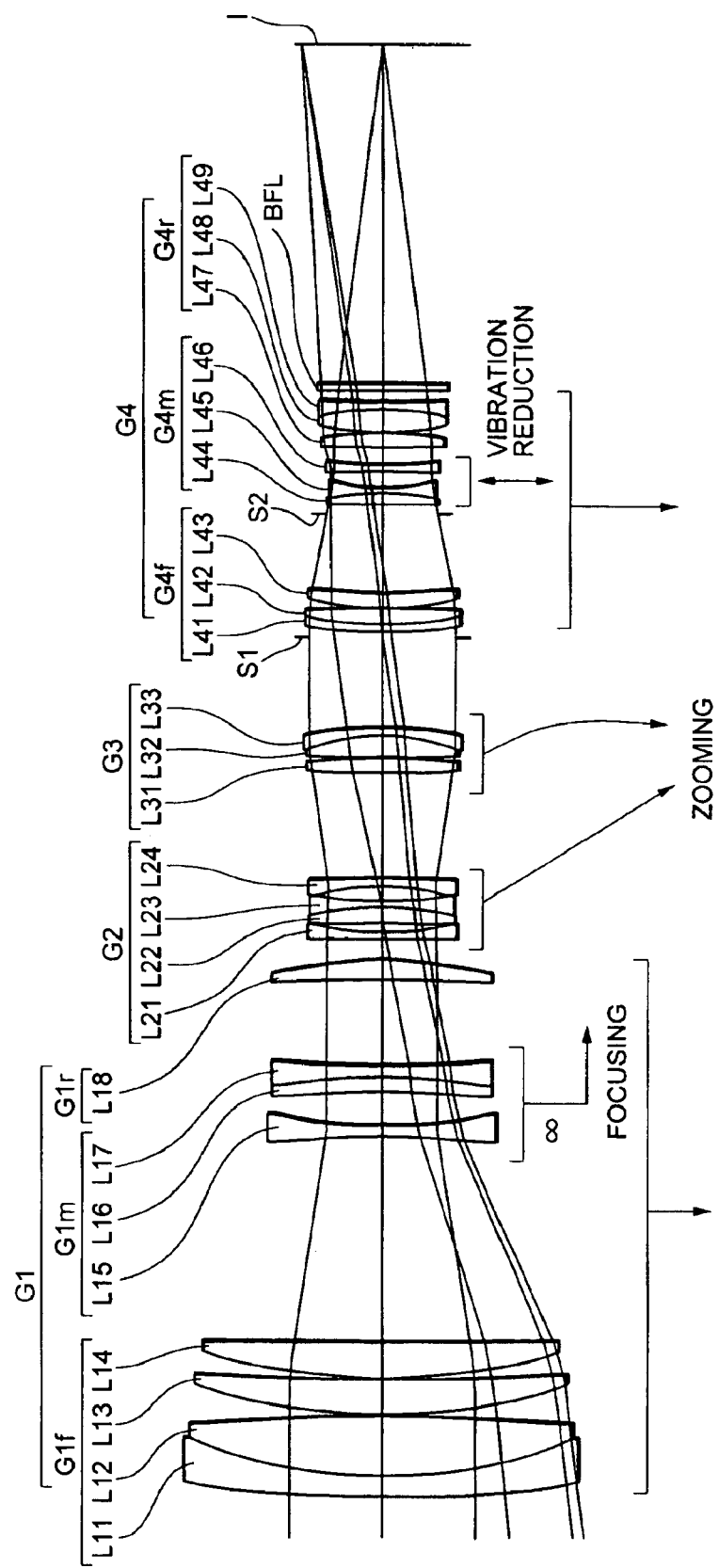
FIG. 1 is a diagram showing the lens arrangement of a large aperture internal focusing telephoto zoom lens system according to Example 1 of the present invention.

Examples of the present invention are going to be explained below with reference to accompanying drawings.

A zoom lens system according to the present invention is composed of, in order from an object, a first lens group G1 having positive refractive power, a second lens group G2 having negative refractive power, a third lens group G3 having positive refractive power, and a fourth lens group G4 having positive refractive power. The zoom lens system is a so-called 4-group afocal zoom lens carrying out zooming by moving the second lens group G2 and the third lens group G3 along the optical axis. The first lens group G1 is composed of, in order from the object, a front lens group of the first lens group G1f having positive refractive power, a middle lens group of the first lens group G1m having negative refractive power, and a rear lens group of the first lens group G1r having positive refractive power. In the fourth lens group G4, there are three lens portions each having refractive power, which are, in order from the object, a front lens group of the fourth lens group G4f having positive refractive power, a middle lens group of the fourth lens group G4m having negative refractive power, and a rear lens group of the fourth lens group G4r having positive refractive power. The front lens group of the first lens group G1f includes two positive lens elements and a negative lens element. The middle lens group of the first lens group G1m includes a positive lens element and a negative lens element. The rear lens group of the first lens group G1r includes a positive lens element. The lens system carries out focusing to a close object by moving the middle lens group of the first lens group G1m along the optical axis. The front lens group of the fourth lens group G4f includes a positive lens element and a negative lens element. The middle lens group of the fourth lens group G4m includes a positive lens element and two negative lens elements. The rear lens group of the fourth lens group G4r includes a positive lens element and a negative lens element. The focusing position is shifted by decentering the middle lens group of the fourth lens group G4m perpendicular to the optical axis. Thus, the large aperture internal focusing telephoto zoom lens system is constructed.

The following conditional expression (1) is preferably satisfied in order to be able to be used as a vibration reduction correction lens with keeping superb optical performance and to obtain the FNO of about 4 or less:

$$2.5 < |(F1f \times F1r234t)/(F1m \times \Phi1)| < 5.0 \quad (1)$$

where $\Phi1$ denotes the maximum effective diameter of the first lens group G1, F1f denotes the focal length of the front lens group of the first lens group G1f, F1m denotes the focal length of the middle lens group of the first lens group G1m, F1r234t denotes the combined focal length of the rear lens group of the first lens group G1r, the second lens group G2, the third lens group G3, and the fourth lens group G4 in the telephoto end state.

The present invention may provide a zoom lens system having the zoom ratio of 1.7 or more, and the focal length in the telephoto end state of 300 mm or more.

When the value $|(F1f \times F1r234t)/(F1m \times \Phi1)|$ exceeds the upper limit of conditional expression (1), the diameter of the focusing lens group becomes large, so it is undesirable that fast auto focusing is difficult to be carried out. On the other hand, when the value falls below the lower limit of conditional expression (1), moving amount of the focusing group upon focusing to a close object becomes large, so it is undesirable. When the upper limit is set to 4.5, the effective diameter of the focusing group becomes relatively small, so it is desirable. When the lower limit is set to 3.0, moving amount of the focusing lens group upon focusing to a close object becomes relatively small, so it is desirable.

Moreover, the following conditional expressions (2) through (5) are preferably satisfied:

$$2.5 < |(F1f \times F4)/(F1mr23t \times \Phi1)| < 5.0 \quad (2)$$

$$2.5 < |(F1 \times F4)/(F23t \times \Phi1)| < 5.0 \quad (3)$$

$$2.5 < |(F1f \times F1r \times F4)/(F1m \times F23t \times \Phi1)| < 5.0 \quad (4)$$

$$0.7 < |(F4 \times F4m)/(F4f \times F4r)| < 1.3 \quad (5)$$

where F1 denotes the focal length of the first lens group G1, F23t denotes the combined focal length of the second lens group G2 and the third lens group G3 in the telephoto end state, F4 denotes the focal length of the fourth lens group G4, F1r denotes the focal length of the rear lens group of the first lens group G1r, F1mr23t denotes the combined focal length of the middle lens group of the first lens group G1m, the rear lens group of the first lens group G1r, the second lens group G2 and the third lens group G3 in the telephoto end state, F4f denotes the focal length of the front lens group of the fourth lens group, F4m denotes the focal length of the middle lens group of the fourth lens group G4m, and F4r denotes the focal length of the rear lens group of the fourth lens group G4r.

When the value $|(F1f \times F4)/(F1mr23t \times \Phi1)|$ exceeds the upper limit of conditional expression (2), variation in spherical aberration upon zooming becomes large, so it is undesirable. On the other hand, when the value falls below the lower limit of conditional expression (2), moving amount of the focusing lens group upon focusing to a close object becomes large, so it is undesirable. When the upper limit is set to 4.5, variation in spherical aberration upon zooming becomes small, so it is desirable. When the lower limit is set to 3.0, the moving amount of the focusing lens group upon focusing to a close object becomes relatively small, so it is desirable.

When the value $|(F1 \times F4)/(F23t \times \Phi1)|$ exceeds the upper limit of conditional expression (3), the flatness of the image plane becomes worse, so it is not desirable. On the other hand, when the value falls below the lower limit of conditional expression (3), the total lens length of the whole lens system becomes long, so it is not desirable. When the upper limit is set to 4.5, the flatness of the image plane becomes better, so it is desirable. When the lower limit is set to 3.0, the total lens length becomes relatively shorter, so it is desirable.

When the value $|(F1f \times F1r \times F4)/(F1m \times F23t \times \Phi1)|$ exceeds the upper limit of conditional expression (4), production of spherical aberration and curvature of field becomes large, so it is undesirable. On the other hand, when the value falls below the lower limit of conditional expression (4), total lens length of the lens system becomes long, so it is undesirable. When the upper limit is set to 4.5, spherical aberration and curvature of field become further better, so it is desirable. When the lower limit is set to 3.0, total lens length of the lens system becomes relatively small, so it is desirable.

When the value $|(F4 \times F4m)/(F4f \times F4r)|$ exceeds the upper limit of conditional expression (5), the flatness of the image plane upon carrying out vibration reduction correction becomes worse, it is undesirable. On the other hand, when the value falls below the lower limit of conditional expression (5), moving amount of G4m perpendicular to the optical axis, which is required for vibration reduction correction, becomes large, so it is undesirable. When the upper limit is set to 1.15, the flatness of the image plane upon carrying out vibration reduction correction becomes better, so it is desirable. When the lower limit is set to 0.85, moving amount of G4m perpendicular to the optical axis becomes further smaller, it is desirable.

Furthermore, in order to make the effective diameter of the lens system corresponding to the hand held portion as narrow as possible, it is effective that the lens system satisfies the following conditional expressions (6) through (9):

$$0.025 < |(Ft \times \Phi4f)/(F4 \times \Phi1 \times \Phi4m)| < 0.045 \quad (6)$$

$$0.025 < |(F1 \times \Phi4f)/(F23t \times \Phi1 \times \Phi4m)| < 0.045 \quad (7)$$

$$0.020 < |(F1f \times \Phi1r)/(F1m \times \Phi1 \times \Phi4m)| < 0.070 \quad (8)$$

$$0.025 < |(F1r \times \Phi4f)/(F23t \times \Phi1r \times \Phi4m)| < 0.045 \quad (9)$$

where Ft denotes the focal length of the whole lens system in the telephoto end state, $\Phi1r$ denotes the maximum effective diameter of the rear lens group of the first lens group G1r, $\Phi4f$ denotes the maximum effective diameter of the front lens group of the fourth lens group G4f, and $\Phi4m$ denotes the maximum effective diameter of the middle lens group of the fourth lens group G4m.

When the value $|(Ft \times \Phi4f)/(F4 \times \Phi1 \times \Phi4 \text{ m})|$ exceeds the upper limit of conditional expression (6), spherical aberration upon carrying out vibration reduction correction becomes worse, so it is undesirable. On the other hand, when the value falls below the lower limit of conditional expression (6), total lens length of the lens system becomes long, so it is undesirable. When the upper limit is set to 0.040, spherical aberration upon carrying out vibration reduction correction becomes better, so it is desirable. When the lower limit is set to 0.027, total lens length of the lens system becomes shorter, so it is desirable.

When the value $|(F1 \times \Phi4f)/(F23t \times \Phi1 \times \Phi4m)|$ exceeds the upper limit of conditional expression (7), the flatness of the image plane becomes worse, so it is not desirable. On the other hand, when the value falls below the lower limit of conditional expression (7), total lens length of the lens system becomes long, so it is undesirable. When the upper limit is set to 0.040, the flatness of the image plane becomes better, so it is desirable. When the lower limit is set to 0.027, the total lens length becomes further shorter, so it is desirable.

When the value $|(F1f \times \Phi1r)/(F1m \times \Phi1 \times \Phi4m)|$ exceeds the upper limit of conditional expression (8), total lens length of the lens system becomes long, so it is undesirable. On the other hand, when the value falls below the lower limit of conditional expression (8), production of spherical aberration and curvature of field becomes large, so it is undesirable. When the upper limit is set to 0.065, total lens length becomes relatively shorter, so it is desirable. When the lower limit is set to 0.026, spherical aberration and curvature of field become further better, so it is desirable.

When the value $|(F1r \times \Phi4f)/(F23t \times \Phi1r \times \Phi4m)|$ exceeds the upper limit of conditional expression (9), production of spherical aberration and curvature of field becomes large with leaving the lens construction as it is, so it is undesirable. On the other hand, when the value falls below the lower limit of conditional expression (9), total lens length of the lens system becomes long, so it is undesirable. When the upper limit is set to 0.040, spherical aberration and curvature of field become further better with constructing the lens system with fewer lens elements as it is, so it is desirable. When the lower limit is set to 0.027, total lens length becomes relatively shorter, so it is desirable.

In order to construct the rear lens group of the first lens group G1r with fewer lens elements, it is effective to satisfy the following conditional expression (10):

$$0.0025 < 1/(Nd1r \times F1r) < 0.0039 \qquad (10)$$

where Nd1r denotes the average refractive index of the lens elements in the rear lens group of the first lens group G1r at d-line.

When the value $1/(Nd1r \times F1r)$ exceeds the upper limit of conditional expression (10), spherical aberration in the telephoto end state becomes large in the negative direction upon leaving the lens construction with fewer lens elements, so it is undesirable. On the other hand, when the value falls below the lower limit of conditional expression (10), total lens length of the lens system becomes long, so it is undesirable. When the upper limit is set to 0.0038, spherical aberration becomes better with constructing the lens system with fewer lens elements as it is, so it is desirable. When the lower limit is set to 0.0031, total lens length becomes relatively shorter, so it is desirable.

In order to increase portability, it is effective that the most object side lens L11 of the front lens group of the first lens group G1f is a negative meniscus lens having a convex surface facing to the object and the following conditional expression (11) is satisfied:

$$-0.0060 < 1/(NdL11 \times FL11) < -0.00050 \qquad (11)$$

where FL11 and NdL11 denote the focal length and refractive index at d-line of the negative meniscus lens, respectively.

In order to increase portability, it is effective to reduce weight of the lens system. For that purpose, when a weatherproof glass is used for the most object side lens L11, a heavy protection glass liable to be used in a so-called super telephoto lens does not become necessary. However, a lens system having the FNO of 4 or less generally has a long total lens length, so it is not suitable for this purpose. When conditional expression (11) is satisfied, optical performance and total lens length of the lens system will be both satisfactory balanced.

When the value $1/(NdL11 \times FL11)$ exceeds the upper limit of conditional expression (11), difference in the radius of curvatures of the first and second surfaces of the lens L11 tends to be null, so it becomes difficult to process the lens. On the other hand, when the value falls below the lower limit of conditional expression (11), the radius of curvature of the second surface of the lens L11 becomes small, so it is undesirable that the lens thickness becomes thick to become heavy. When the upper limit is set to −0.0010, it becomes easy to process the lens, so it is desirable. When the lower limit is set to −0.0030, total lens length becomes further shorter, so it is desirable.

In order to obtain good optical performance upon carrying out vibration reduction correction, it is preferable that the front lens group of the fourth lens group G4f is composed of two positive lens elements and a negative lens element, and that the rear lens group of the fourth lens group G4r is composed of two positive lens elements and a negative lens element.

In order to obtain good optical property, it is preferable to arrange a field stop between the front lens group of the fourth lens group G4f and the middle lens group of the fourth lens group G4m.

Examples according to the present invention are explained below with reference to accompanying drawings.

EXAMPLE 1

FIG. 1 is a diagram showing the lens arrangement of a large aperture internal focusing telephoto zoom lens system according to Example 1 of the present invention.

In FIG. 1, the zoom lens system is composed of, in order from an object, a first lens group G1 having positive refractive power, a second lens group G2 having negative refractive power, a third lens group G3 having positive refractive power, and a fourth lens group G4 having positive refractive power. Zooming is carried out by moving the second lens group G2 and the third lens group G3 along the optical axis. In the fourth lens group G4, there are three lens portions with refractive power that are, in order from the object, a front lens group of the fourth lens group G4f having positive refractive power, a middle lens group of the fourth lens group G4m having negative refractive power, and a rear lens group of the fourth lens group G4r having positive refractive power. Vibration reduction correction is carried out by changing the focusing position with shifting the middle lens group of the fourth lens group G4m perpendicular to the optical axis.

The first lens group G1 having positive refractive power is composed of a front lens group of the first lens group G1f fixed along the optical axis relative to an image plane I, a middle lens group of the first lens group G1m movable along the optical axis, and a rear lens group of the first lens group G1r fixed along the optical axis relative to the image plane. Focusing to a close object is carried out by moving the middle lens group of the first lens group G1m along the optical axis.

As for each lens element, the front lens group of the first lens group G1f is composed of, in order from the object, a cemented positive lens constructed by a negative meniscus lens L11 having a convex surface facing to the object cemented with a double convex lens L12, a positive meniscus lens L13 having a convex surface facing to the object, and a positive meniscus lens L14 having a convex surface facing to the object. The middle lens group of the first lens group G1m is composed of, in order from the object, a double concave lens L15, and a cemented negative lens constructed by a positive meniscus lens L16 having a convex surface facing to an image cemented with a double concave lens L17. The rear lens group of the first lens group G1r is composed of a positive meniscus lens L18 having a convex surface facing to the image. The second lens group G2 is composed of, in order from the object, a negative lens L21 having a stronger concave surface facing to the image, a cemented negative lens constructed by a double convex lens L22 cemented with a double concave lens L23, and a negative meniscus lens L24 having a stronger concave surface facing to the object. The third lens group G3 is composed of, in order from the object, a double convex lens L31, and a cemented positive lens constructed by a positive lens L32 having a gentle radius of curvature facing to the object cemented with a negative meniscus lens L33 having a concave surface facing to the object. Next to the third lens group G3, there is an aperture stop S1. The front lens group of the fourth lens group G4f is composed of, in order from the object, a cemented positive lens constructed by a negative meniscus lens L41 having a convex surface facing to the object cemented with a double convex lens L42, and a positive meniscus lens L43 having a convex surface facing to the object. There is a field stop S2 apart from the front lens group of the fourth lens group G4f with a wide space. The middle lens group of the fourth lens group G4m is composed of, in order from the object, a cemented negative lens constructed by a double convex lens L44 cemented with a double concave lens L45, and a double concave lens L46. The rear lens group of the fourth lens group G4r is composed of, in order from the object, a double convex lens L47, and a cemented positive lens constructed by a double convex lens L48 cemented with a double concave lens L49. The fourth lens group G4 further includes a rear-inserting filter BFL. Thus the large aperture internal focusing telephoto zoom lens according to Example 1 is constructed.

Various values associated with Example 1 are listed in Table 1. In Table 1, F denotes the focal length of the zoom lens system, FNO denotes the f-number, β denotes the imaging magnification, BF denotes back focal length, D0 denotes the distance between an object and the object side surface of the lens L11 in the first lens group G1. I denotes the image plane. The number in the left side column denotes surface number in order from the object, r denotes radius of curvature of each lens surface, d denotes a distance along the optical axis between adjacent lens surfaces, nd denotes refractive index of a medium between adjacent lens surfaces at d-line (λ=587.6 nm), ν denotes Abbe number of a medium between adjacent lens surfaces, and refractive index of the air 1.00000 is omitted. Φ1 denotes the maximum effective diameter of the first lens group G1, Φ1r denotes the maximum effective diameter of the rear lens group of the first lens group G1r, Φ4f denotes the maximum effective diameter of the front lens group of the fourth lens group G4f, Φ4m denotes the maximum effective diameter of the middle lens group of the fourth lens group G4m. Radius curvature 0.0000 means a flat plane.

In the tables for various values, "mm" is generally used for the unit of length such as the focal length, the radius of curvature, and the separation between lens surfaces. However, since an optical system proportionally enlarged or reduced its dimension can be obtained similar optical performance, the unit is not necessary to be limited to "mm" and any other suitable unit can be used.

The above-mentioned explanation can be applied to any other Examples in the present invention.

TABLE 1

(Specifications)

F: 204.0 392.00 mm
FNO: 4.08

(Lens Data)

| | r | d | ν | nd | Φ |
|---|---|---|---|---|---|
| 1) | 370.787 | 5.30 | 33.89 | 1.80384 | Φ1f = 102.10 |
| 2) | 127.285 | 16.00 | 82.56 | 1.49782 | |
| 3) | −684.010 | 0.20 | | | |
| 4) | 141.046 | 9.50 | 82.56 | 1.49782 | |
| 5) | 729.910 | 0.20 | | | |
| 6) | 158.558 | 9.50 | 82.56 | 1.49782 | |
| 7) | 3054.000 | (d7) | | | |
| 8) | −294.108 | 2.90 | 47.38 | 1.78800 | |
| 9) | 141.046 | 9.00 | | | |
| 10) | −452.783 | 4.00 | 23.78 | 1.84666 | |
| 11) | −194.473 | 2.90 | 65.47 | 1.60300 | |
| 12) | 308.660 | (d12) | | | |
| 13) | −674.360 | 5.40 | 39.59 | 1.80440 | |
| 14) | −113.025 | (d14) | | | Φ1r = 55.86 |
| 15) | 699.210 | 1.90 | 55.52 | 1.69680 | |
| 16) | 80.551 | 2.05 | | | |
| 17) | 749.830 | 4.50 | 23.78 | 1.84666 | |
| 18) | −81.072 | 1.90 | 60.09 | 1.64000 | |
| 19) | 148.037 | 3.94 | | | |
| 20) | −61.497 | 1.90 | 60.09 | 1.64000 | |
| 21) | −661.360 | (d21) | | | |
| 22) | 349.981 | 3.50 | 65.47 | 1.60300 | |
| 23) | −349.981 | 0.50 | | | |
| 24) | 623.770 | 6.00 | 65.47 | 1.60300 | |
| 25) | −52.992 | 1.90 | 28.55 | 1.79504 | |
| 26) | −104.522 | (d26) | | | |
| 27> | 0.000 | 1.00 | | | Aperture Stop S1 |
| 28) | 119.718 | 2.00 | 33.89 | 1.80384 | Φ4f = 38.49 |
| 29) | 81.535 | 4.50 | 65.47 | 1.60300 | |
| 30) | −848.550 | 0.10 | | | |
| 31) | 68.648 | 4.00 | 65.47 | 1.60300 | |
| 32) | 159.707 | 22.00 | | | |
| 33) | 0.000 | 2.27 | | | Field Stop S2 |
| 34) | 440.216 | 3.30 | 23.78 | 1.84666 | Φ4m = 27.83 |
| 35) | −72.192 | 1.60 | 52.67 | 1.74100 | |
| 36) | 57.121 | 4.50 | | | |
| 37) | −462.274 | 1.60 | 52.67 | 1.74100 | |
| 38) | 110.561 | 4.86 | | | |
| 39) | 286.107 | 4.00 | 82.56 | 1.49782 | |
| 40) | −91.116 | 0.10 | | | |
| 41) | 64.829 | 6.50 | 60.09 | 1.64000 | |
| 42) | −64.829 | 1.70 | 23.78 | 1.84666 | |
| 43) | 417.363 | 3.00 | | | |
| 44) | 0.000 | 2.00 | 64.12 | 1.51680 | |
| 45) | 0.000 | Bf | | | |

(Variable distance upon focusing and zooming)

| | Wide-angle | Middle | Telephoto |
|---|---|---|---|
| <Focused at infinity> | | | |
| F | 204.0000 | 300.0000 | 392.0000 |
| D0 | ∞ | ∞ | ∞ |
| d7 | 54.90581 | 54.90581 | 54.90581 |
| d12 | 23.85167 | 23.85167 | 23.85167 |
| d14 | 5.84488 | 38.59130 | 54.82963 |
| d21 | 29.27185 | 15.53993 | 2.41844 |
| Bf | 91.16781 | 91.16781 | 91.16781 |
| <Focused at closest distance> | | | |
| β | −0.13941 | −0.20502 | −0.26789 |
| D0 | 1607.6776 | 1607.6776 | 1607.6776 |
| d7 | 72.39989 | 72.39989 | 72.39989 |
| d12 | 6.35759 | 6.35759 | 6.35759 |
| d14 | 5.84488 | 38.59130 | 54.82963 |
| d21 | 29.27185 | 15.53993 | 2.41844 |
| d26 | 25.24955 | 6.23504 | 3.11820 |
| Bf | 91.16781 | 91.16781 | 91.16781 |

(Moving Amount for Vibration reduction correction)

TABLE 1-continued

<Focused at infinity>

| F | 204.0000 | 300.0000 | 392.0000 |
|---|---|---|---|
| G4m | 1.000 | 1.000 | 1.000 |
| I (Image Plane) | −1.828 | −1.828 | −1.828 |

<Focused at closest distance>

| β | −0.13941 | −0.20502 | −0.26789 |
|---|---|---|---|
| G4m | 1.000 | 1.000 | 1.000 |
| I (Image Plane) | −1.828 | −1.828 | −1.828 |

Figure 2:
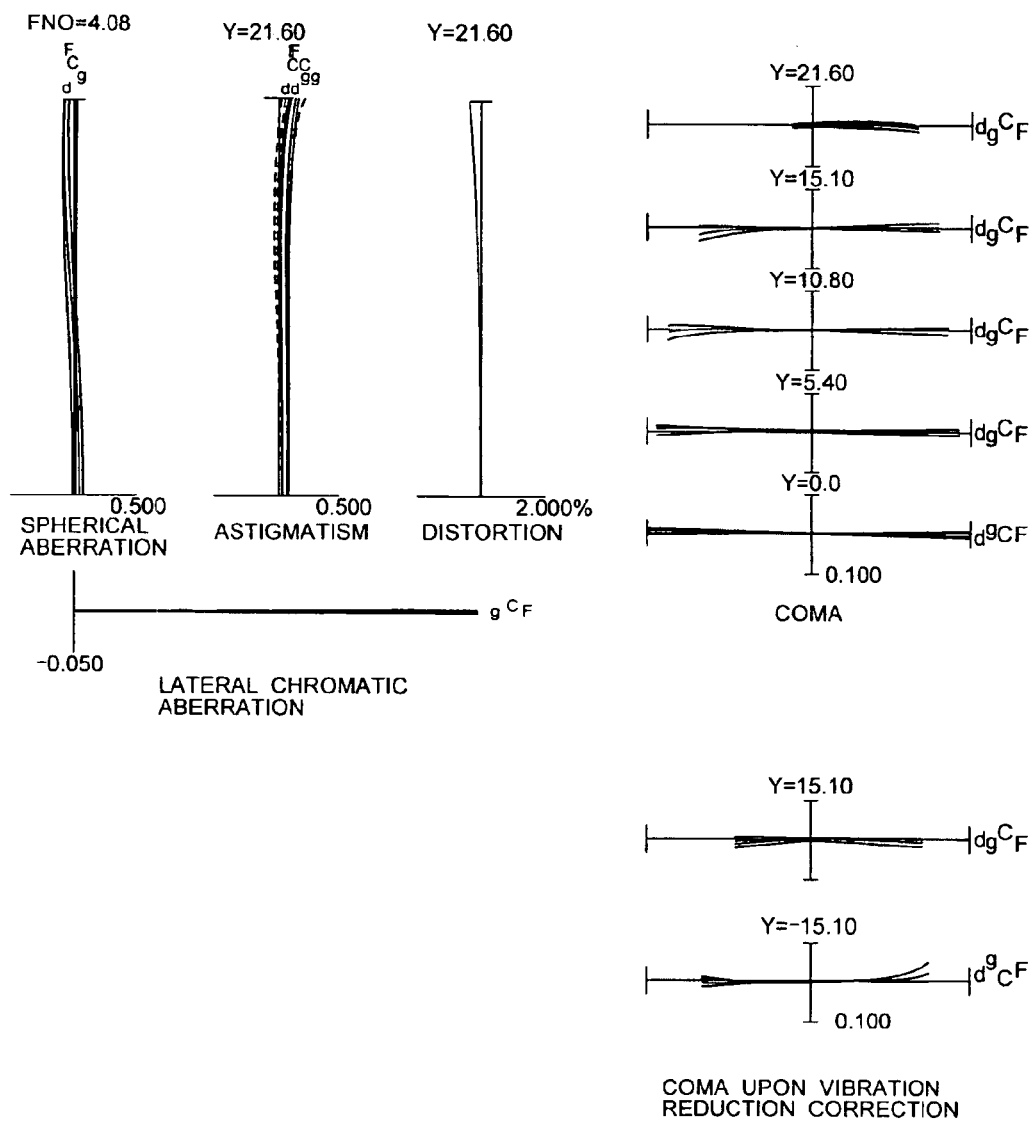
FIG. 2 graphically shows various aberrations of the zoom lens system according to Example 1 in a wide-angle end state when the system is focused at infinity.
Figure 3:
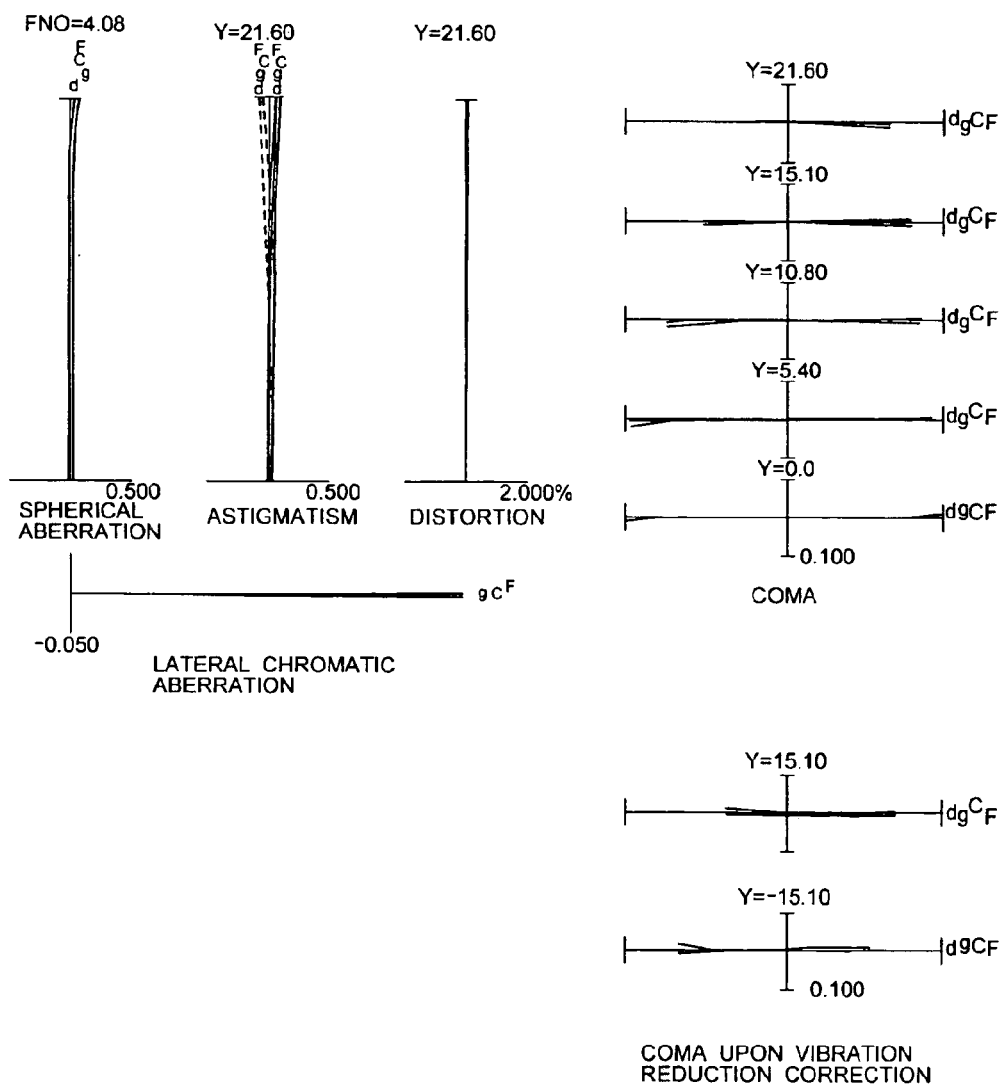
FIG. 3 graphically shows various aberrations of the zoom lens system according to Example 1 in an intermediate focal length state when the system is focused at infinity.
Figure 4:
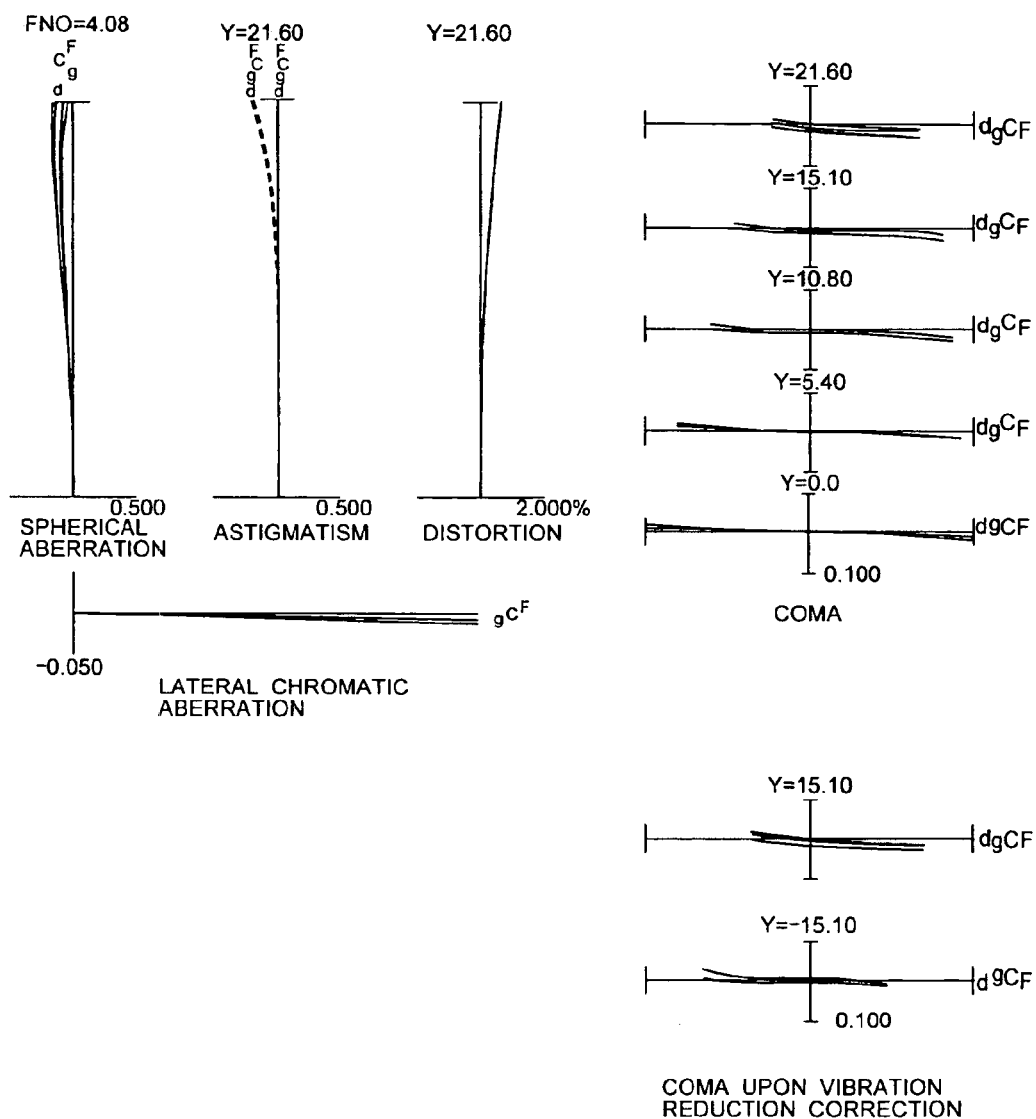
FIG. 4 graphically shows various aberrations of the zoom lens system according to Example 1 in a telephoto end state when the system is focused at infinity.
Figure 5:
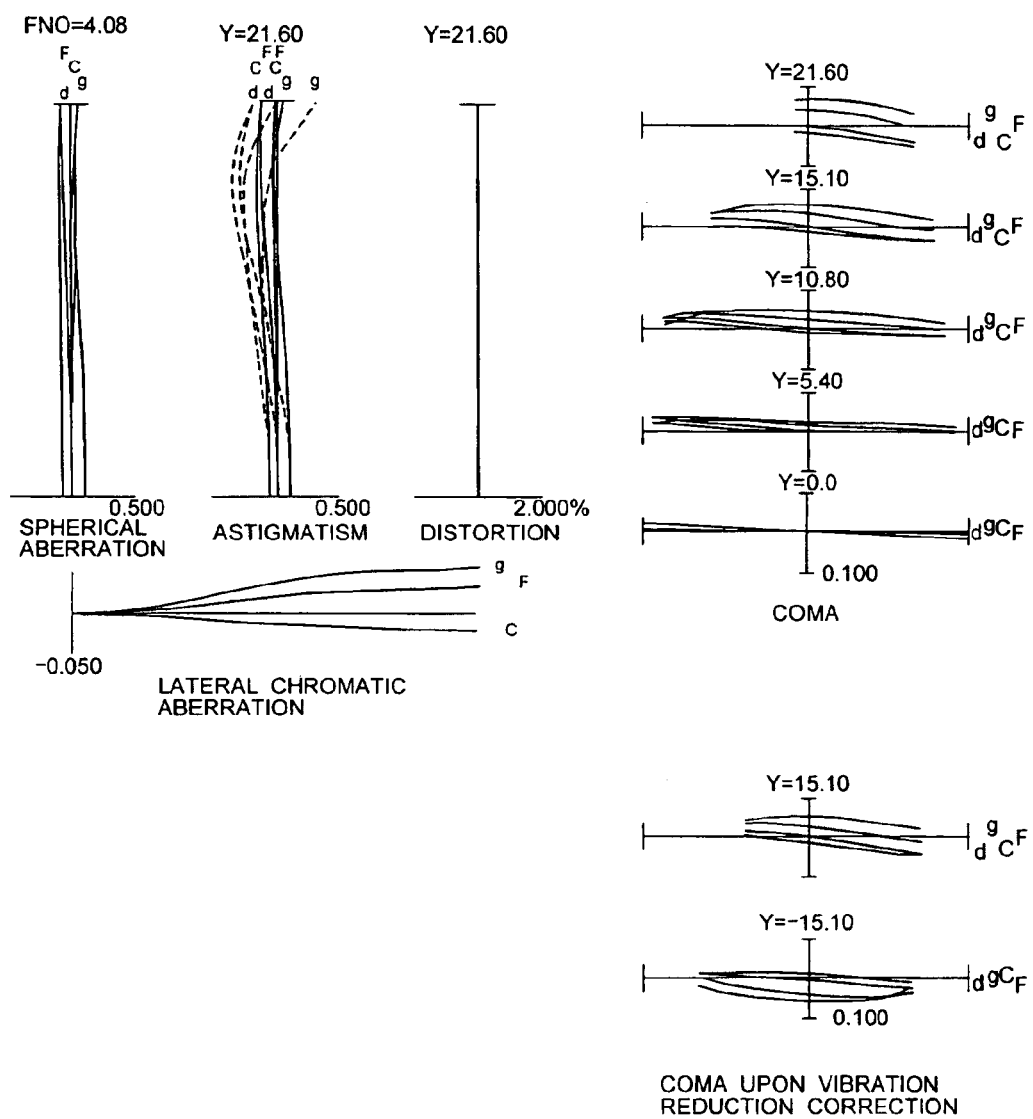
FIG. 5 graphically shows various aberrations of the zoom lens system according to Example 1 in the wide-angle end state when the system is focused at the closest focusing distance.
Figure 6:
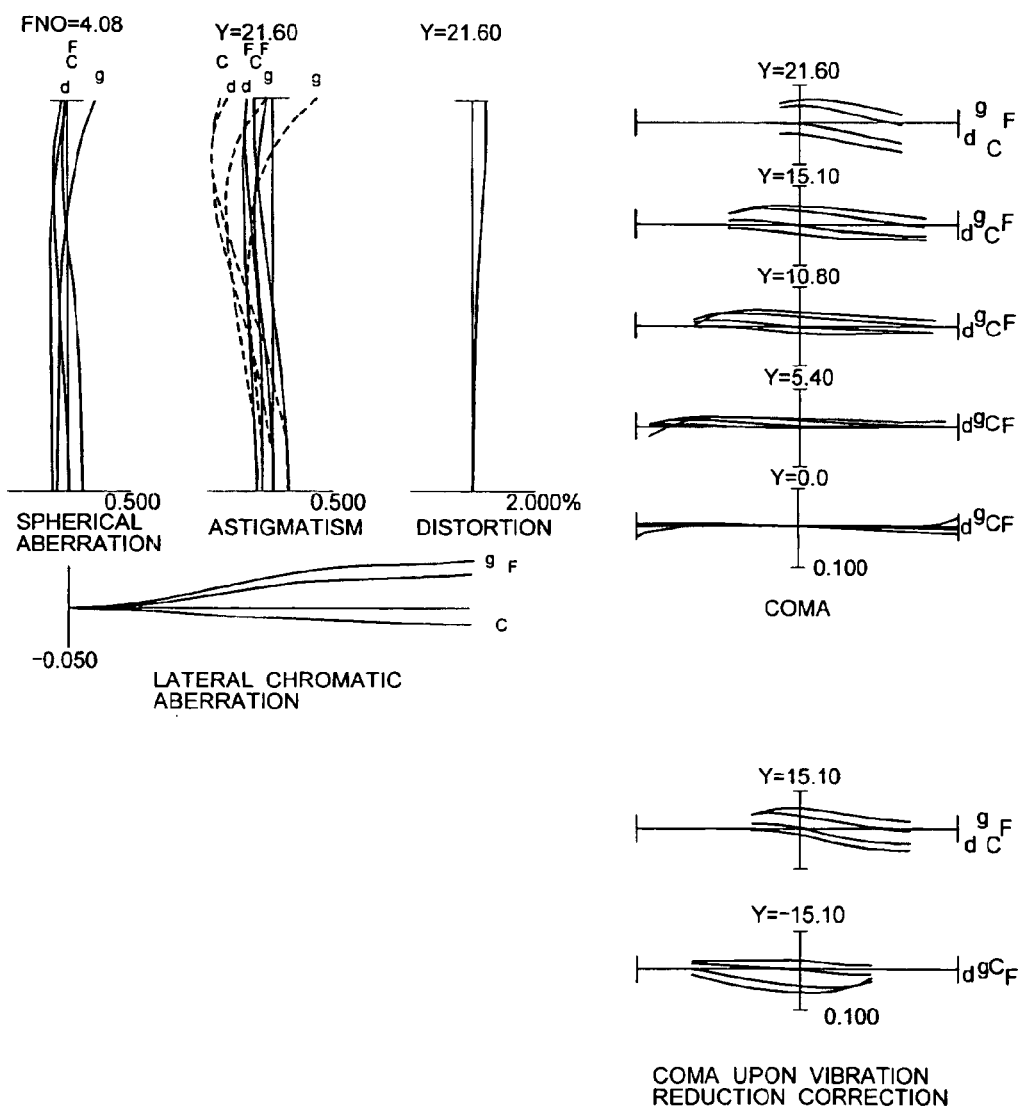
FIG. 6 graphically shows various aberrations of the zoom lens system according to Example 1 in the intermediate focal length state when the system is focused at the closest focusing distance.
Figure 7:
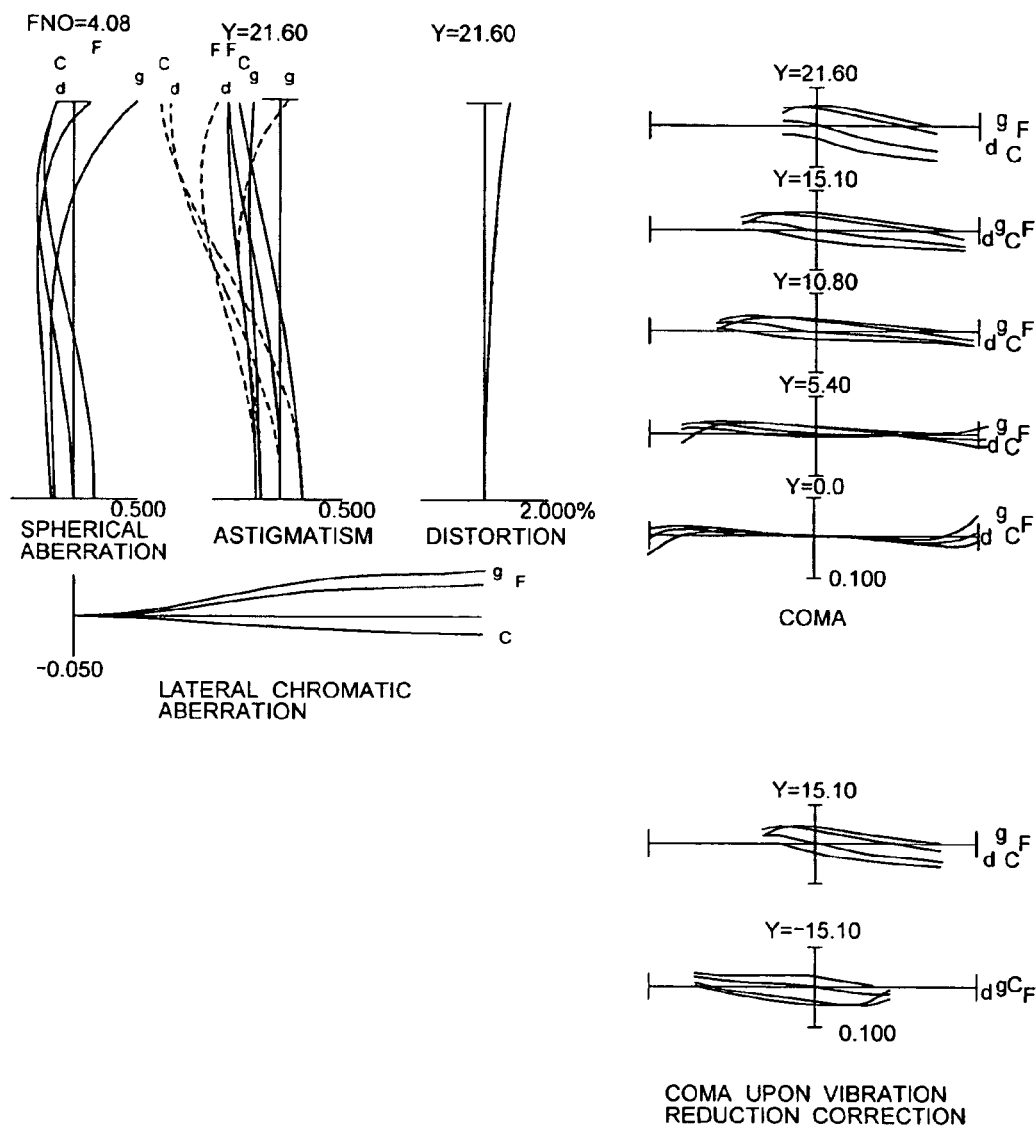
FIG. 7 graphically shows various aberrations of the zoom lens system according to Example 1 in the telephoto end state when the system is focused at the closest focusing distance.

FIGS. 2, 3, 4 graphically show various aberrations of the zoom lens system according to Example 1 in the wide-angle end state, the intermediate focal length state, and the telephoto end state, respectively, when the system is focused at infinity. FIGS. 5, 6, 7 graphically show various aberrations of the zoom lens system in the wide-angle end state, the intermediate focal length state, and the telephoto end state, respectively, when the system is focused at the closest focusing distance (R=2000 mm). In respective graphs, Y denotes an image height, FNO denotes the f-number, D denotes d-line (λ=587.6 nm), G denotes g-line (λ=435.6 nm), C denotes C-line (λ=656.3 nm), and F denotes F-line (λ=486.1 nm). In the graphs showing spherical aberration, f-number according to the maximum aperture or the maximum NA value is shown. In the graphs showing astigmatism or distortion, the value of the maximum image height Y is shown. In the graphs showing coma, the value of each image height Y is shown. In the graphs showing astigmatism, a solid line indicates a sagittal image plane, and a broken line indicates a meridional image plane. In all aberration graphs of the following examples, the same denotations are applied.

Values for conditional expressions are listed all together in Table 4 at the end of Example 3.

As is apparent from the respective graphs showing various aberrations, excellent compensation is made for various aberrations upon operating vibration reduction correction as well as common use.

EXAMPLE 2

Figure 8:
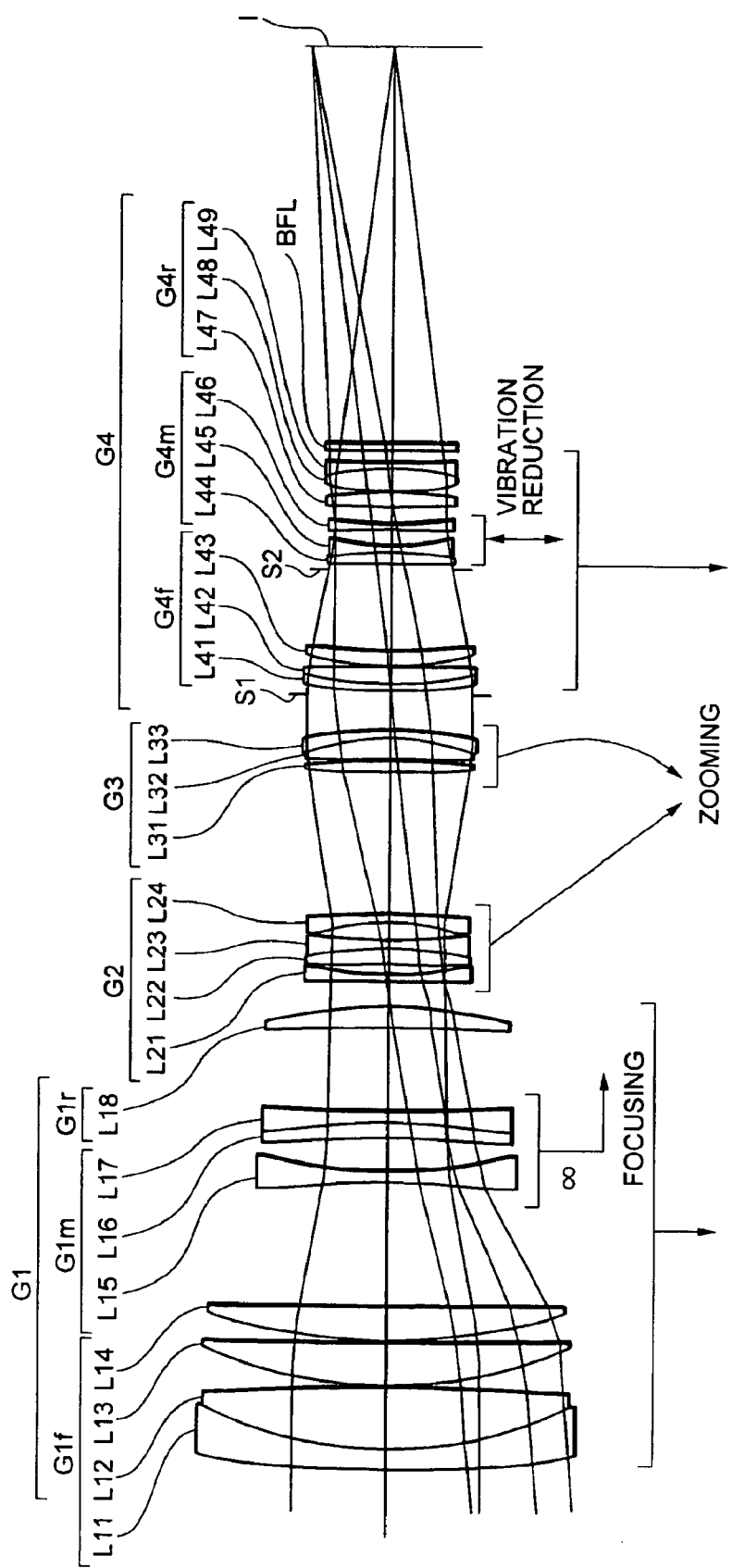
FIG. 8 is a diagram showing the lens arrangement of a large aperture internal focusing telephoto zoom lens system according to Example 2 of the present invention.

FIG. 8 is a diagram showing the lens arrangement of a large aperture internal focusing telephoto zoom lens system according to Example 2 of the present invention in a wide-angle end state focusing at infinity. Construction of each lens group is the same as that of Example 1, so duplicated explanation is avoided.

Various values associated with Example 2 of the present invention are listed in Table 2.

TABLE 2

(Specifications)

| F: | 204.00 | | 392.00 mm |
|---|---|---|---|
| FNO: | 4.08 | | |

(Lens Data)

| | r | d | ν | nd | Φ |
|---|---|---|---|---|---|
| 1) | 307.3433 | 5.30 | 33.89 | 1.80384 | Φ1f = 98.00 |
| 2) | 105.1555 | 17.00 | 82.56 | 1.49782 | |
| 3) | −597.7919 | 0.20 | | | |
| 4) | 123.4141 | 11.00 | 82.56 | 1.49782 | |
| 5) | 2021.0593 | 0.20 | | | |
| 6) | 139.0111 | 9.50 | 82.56 | 1.49782 | |

TABLE 2-continued

| 7) | 5459.3449 | (d7) | | | |
|---|---|---|---|---|---|
| 8) | −312.9890 | 2.90 | 47.38 | 1.78800 | |
| 9) | 129.3204 | 9.00 | | | |
| 10) | −521.7640 | 4.00 | 23.78 | 1.84666 | |
| 11) | −183.5824 | 2.90 | 65.47 | 1.60300 | |
| 12) | 309.1483 | (d12) | | | |
| 13) | −572.7124 | 6.00 | 39.59 | 1.80440 | |
| 14) | −109.8916 | (d14) | | | Φ1r = 61.73 |
| 15) | −37746.8820 | 1.90 | 55.52 | 1.69680 | |
| 16) | 78.6678 | 3.00 | | | |
| 17) | 886.9739 | 4.50 | 23.78 | 1.84666 | |
| 18) | −81.1191 | 1.90 | 60.09 | 1.64000 | |
| 19) | 148.3783 | 5.00 | | | |
| 20) | −60.7376 | 1.90 | 60.09 | 1.64000 | |
| 21) | −242.9932 | (d21) | | | |
| 22) | 232.1951 | 3.50 | 65.47 | 1.60300 | |
| 23) | −232.1951 | 0.50 | | | |
| 24) | −558.3594 | 6.00 | 65.47 | 1.60300 | |
| 25) | −60.4971 | 1.90 | 28.55 | 1.79504 | |
| 26) | −125.7892 | (d26) | | | |
| 27> | 0.0000 | 1.00 | | | Aperture Stop S1 |
| 28) | 116.7579 | 2.00 | 33.89 | 1.80384 | Φ4f = 43.29 |
| 29) | 94.2184 | 4.50 | 65.47 | 1.60300 | |
| 30) | −1221.5662 | 0.10 | | | |
| 31) | 72.2443 | 4.00 | 65.47 | 1.60300 | |
| 32) | 139.6178 | 22.00 | | | |
| 33) | 0.0000 | 1.75 | | | Field Stop S2 |
| 34) | 440.2160 | 3.30 | 23.78 | 1.84666 | Φ4m = 31.80 |
| 35) | −72.1920 | 1.60 | 52.67 | 1.74100 | |
| 36) | 57.1210 | 4.50 | | | |
| 37) | −462.2740 | 1.60 | 52.67 | 1.74100 | |
| 38) | 110.5610 | 4.75 | | | |
| 39) | 297.0630 | 4.00 | 82.56 | 1.49782 | |
| 40) | −93.6283 | 0.10 | | | |
| 41) | 64.9661 | 6.50 | 60.09 | 1.64000 | |
| 42) | −64.9661 | 1.70 | 23.78 | 1.84666 | |
| 43) | 475.7340 | 3.00 | | | |
| 44) | 0.0000 | 2.00 | 64.12 | 1.51680 | |
| 45) | 0.0000 | Bf | | | |

(Variable distance upon focusing and zooming)

| | Wide-angle | Middle | Telephoto |
|---|---|---|---|
| | <Focused at infinity> | | |
| F | 204.0000 | 300.0000 | 392.0000 |
| D0 | ∞ | ∞ | ∞ |
| d7 | 33.09192 | 33.09192 | 33.09192 |
| d12 | 23.06833 | 23.06833 | 23.06833 |
| d14 | 6.34150 | 30.23978 | 42.06173 |
| d21 | 38.90070 | 20.18608 | 2.38896 |
| d26 | 9.86848 | 4.68483 | 10.66000 |
| Bf | 106.23003 | 106.23003 | 106.23003 |
| | <Focused at closest distance> | | |
| β | −0.13418 | −0.19732 | −0.25783 |
| D0 | 1615.9983 | 1615.9983 | 1615.9983 |
| d7 | 44.4275 | 44.4275 | 44.4275 |
| d12 | 11.73272 | 11.73272 | 11.73272 |
| d14 | 6.34150 | 30.23978 | 42.06173 |
| d21 | 38.90070 | 20.18608 | 2.38896 |
| d26 | 9.86848 | 4.68483 | 10.66000 |
| Bf | 106.23003 | 106.23003 | 106.23003 |

(Moving Amount for Vibration reduction correction)
<Focused at infinity>

| F | 204.0000 | 300.0000 | 392.0000 |
|---|---|---|---|
| G4m | 1.000 | 1.000 | 1.000 |
| I (Image Plane) | −2.074 | −2.074 | −2.074 |

<Focused at closest distance>

| β | −0.13418 | −0.19732 | −0.25783 |
|---|---|---|---|
| G4m | 1.000 | 1.000 | 1.000 |
| I (Image Plane) | −2.074 | −2.074 | −2.074 |

Figure 9:
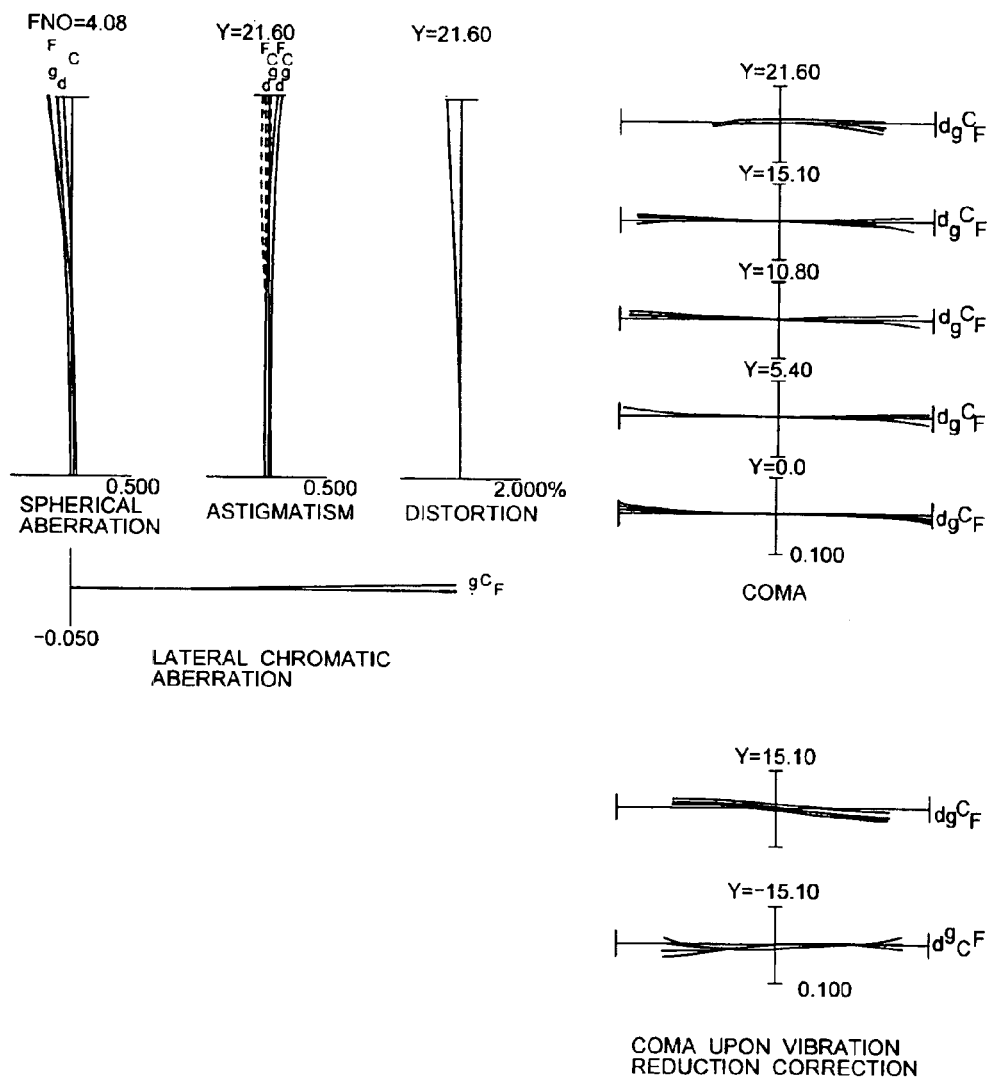
FIG. 9 graphically shows various aberrations of the zoom lens system according to Example 2 in a wide-angle end state when the system is focused at infinity.
Figure 10:
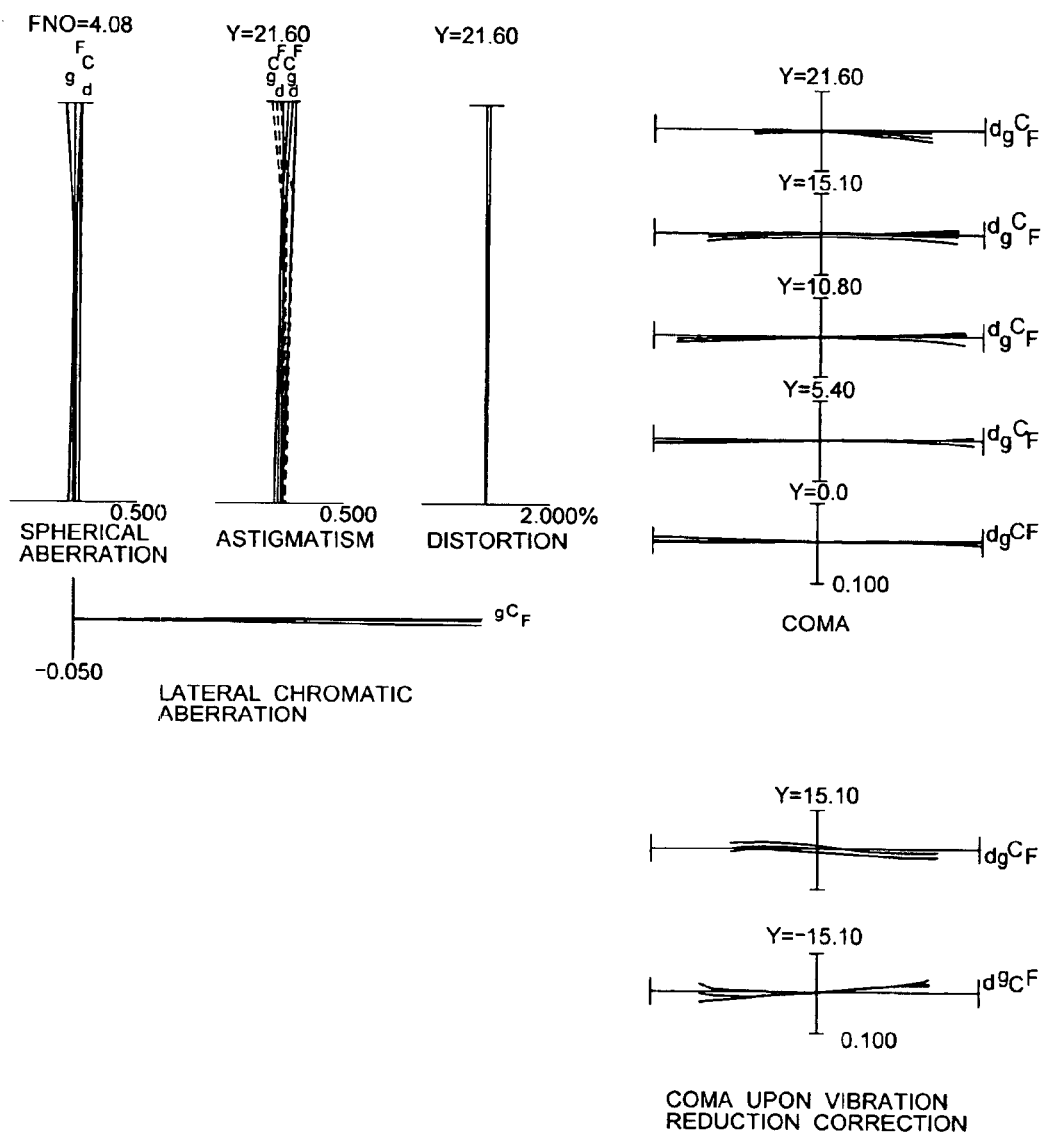
FIG. 10 graphically shows various aberrations of the zoom lens system according to Example 2 in an intermediate focal length state when the system is focused at infinity.
Figure 11:
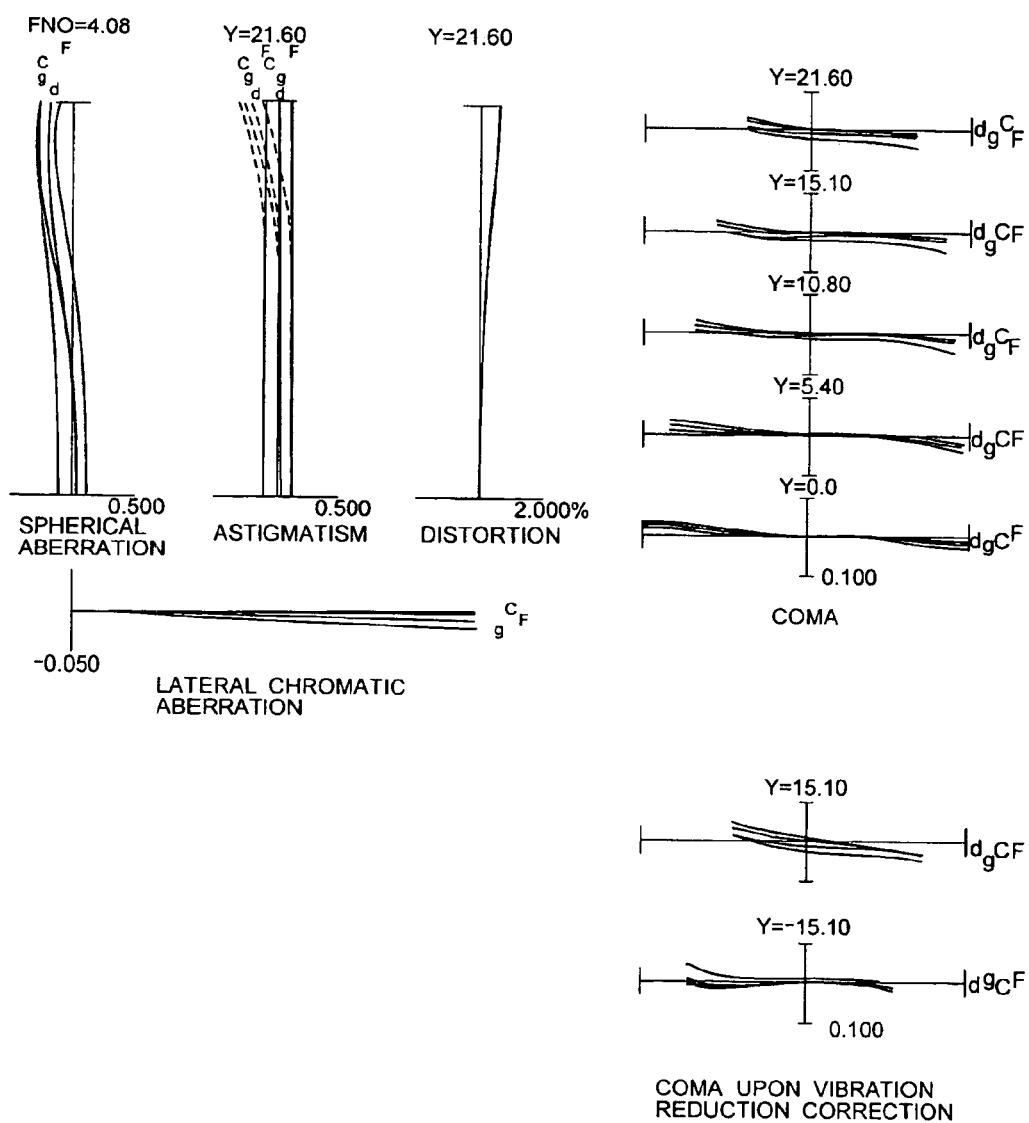
FIG. 11 graphically shows various aberrations of the zoom lens system according to Example 2 in a telephoto end state when the system is focused at infinity.
Figure 12:
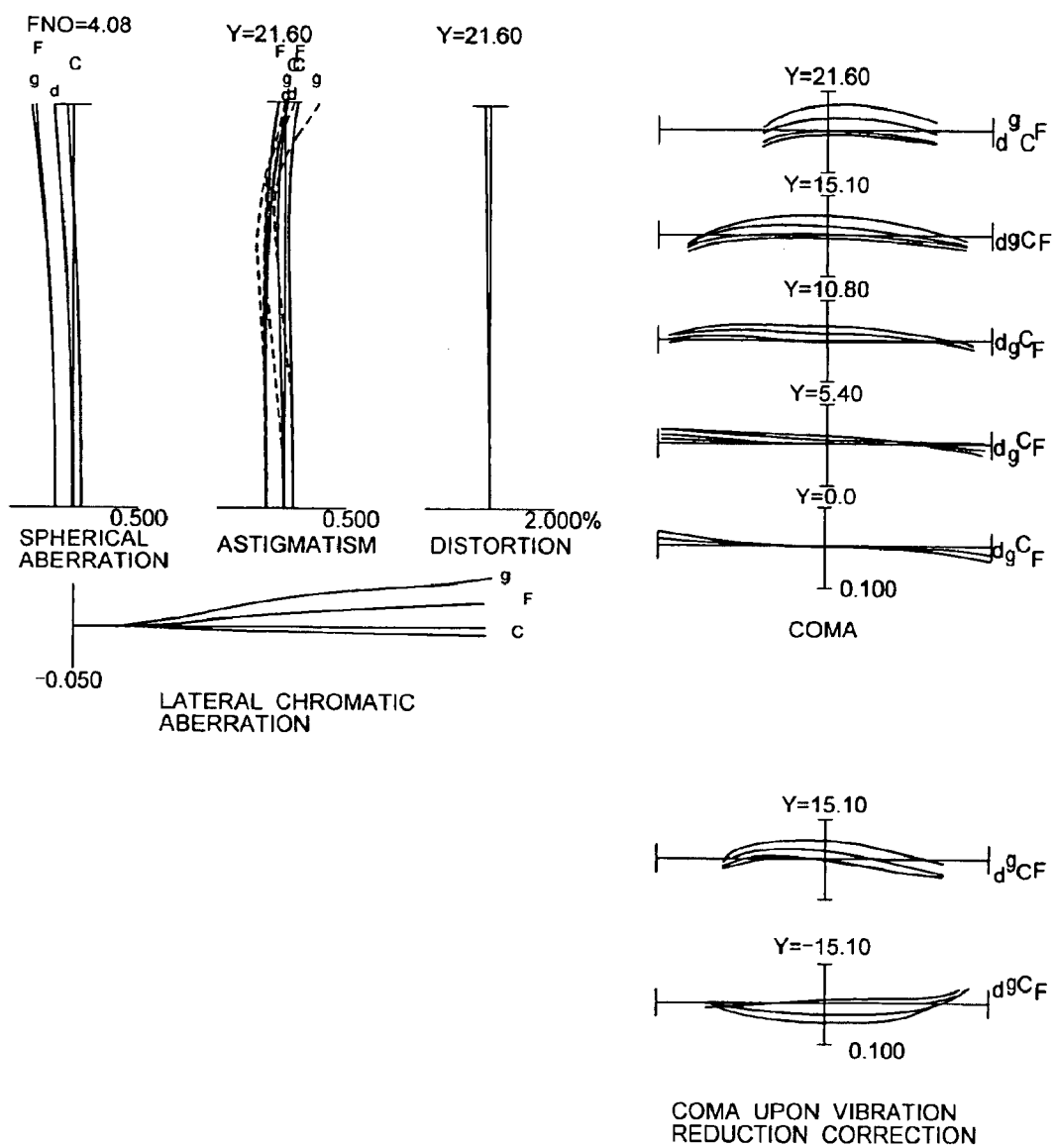
FIG. 12 graphically shows various aberrations of the zoom lens system according to Example 2 in the wide-angle end state when the system is focused at the closest focusing distance.
Figure 13:
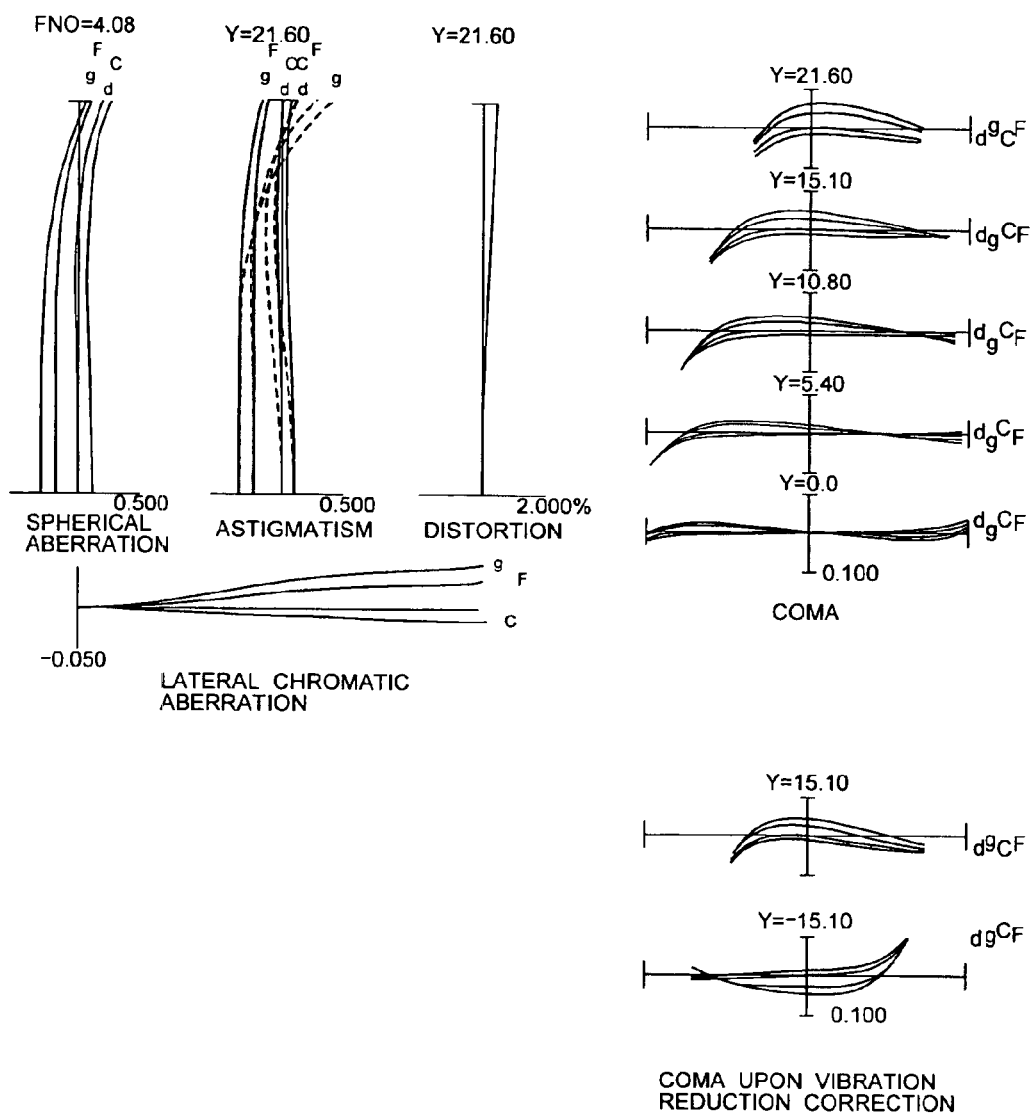
FIG. 13 graphically shows various aberrations of the zoom lens system according to Example 2 in the intermediate focal length state when the system is focused at the closest focusing distance.
Figure 14:
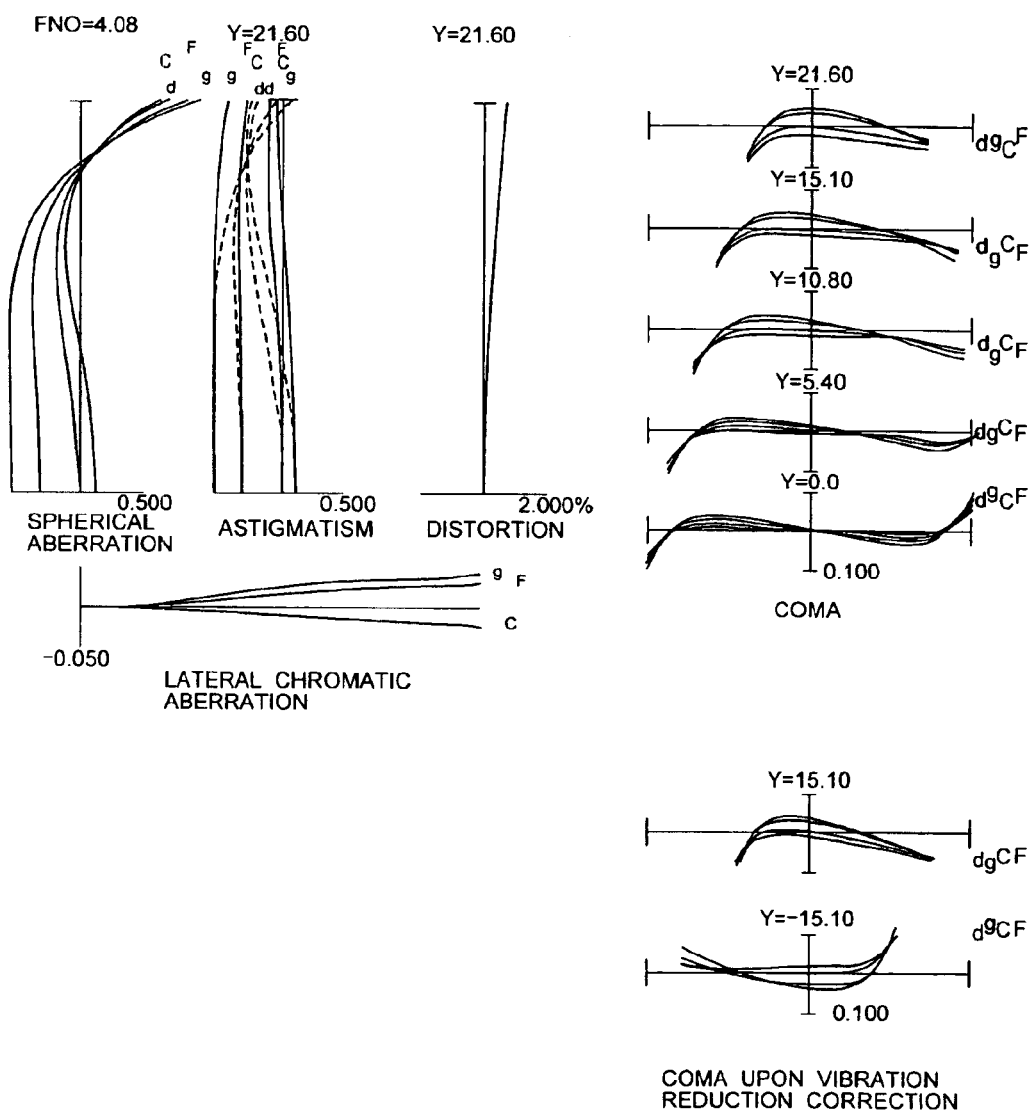
FIG. 14 graphically shows various aberrations of the zoom lens system according to Example 2 in the telephoto end state when the system is focused at the closest focusing distance.

FIGS. 9, 10, 11 graphically show various aberrations of the zoom lens system according to Example 2 in the wide-angle end state, the intermediate focal length state, and the telephoto end state, respectively, when the system is focused at infinity. FIGS. 12, 13, 14 graphically show various aberrations of the zoom lens system in the wide-angle end state, the intermediate focal length state, and the telephoto end state, respectively, when the system is focused at the closest focusing distance (R=2000 mm).

As is apparent from the respective graphs showing various aberrations, excellent compensation is made for various aberrations upon operating vibration reduction correction as well as common use.

EXAMPLE 3

Figure 15:
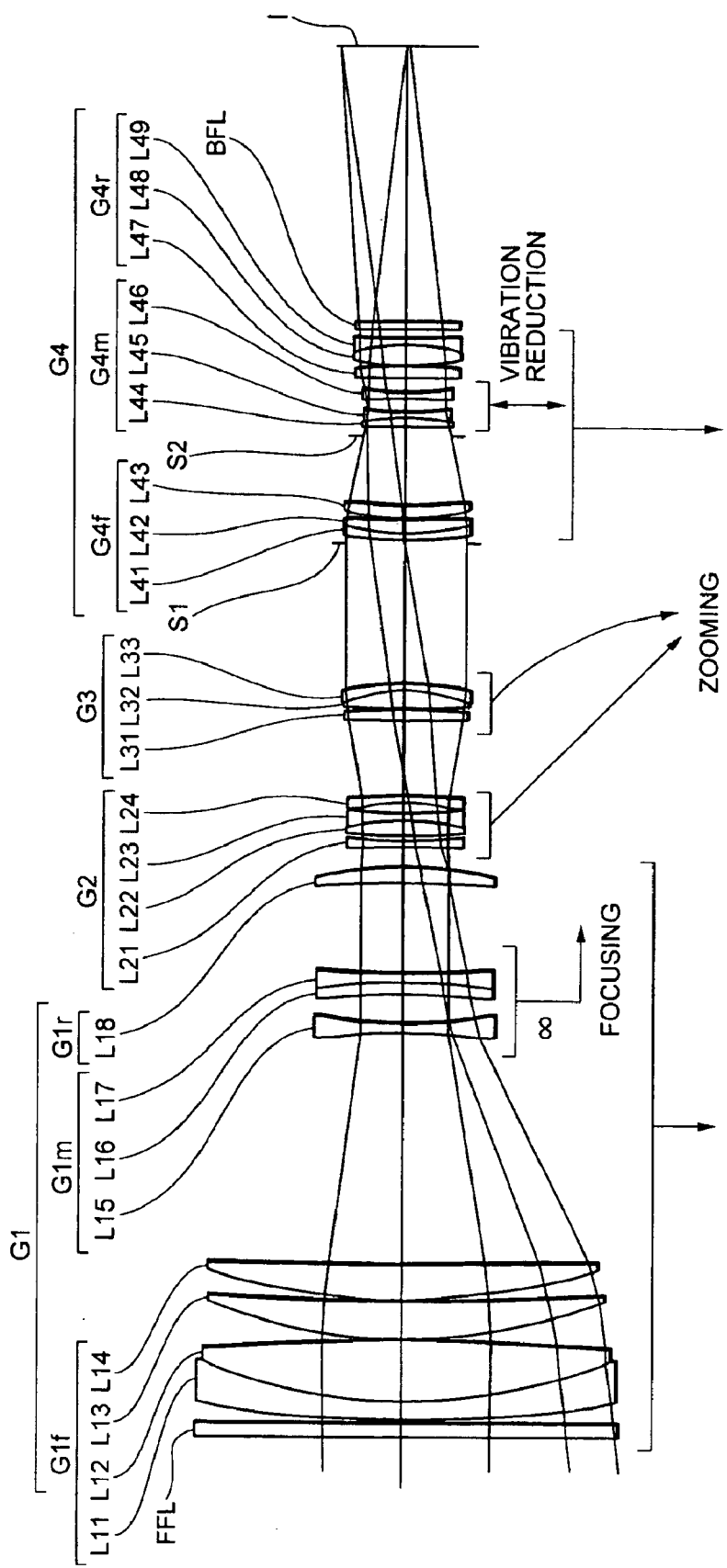
FIG. 15 is a diagram showing the lens arrangement of a large aperture internal focusing telephoto zoom lens system according to Example 3 of the present invention.

FIG. 15 is a diagram showing the lens arrangement of a large aperture internal focusing telephoto zoom lens system according to Example 3 of the present invention in the wide-angle end state focusing at infinity. Construction of each lens group is the same as that of Example 1, so duplicated explanation is avoided.

Various values associated with Example 3 of the present invention are listed in Table 3.

TABLE 3

(Specifications)

| F: | 204.00 | 392.00 mm |
|---|---|---|
| FNO: | 4.08 | |

(Lens Data)

| | r | d | ν | nd | Φ |
|---|---|---|---|---|---|
| 1) | 0.0000 | 4.00 | 64.12 | 1.51680 | |
| 2) | 0.0000 | 1.20 | | | |
| 3) | 374.1092 | 5.30 | 33.89 | 1.80384 | Φ1f = 126.00 |
| 4) | 154.7822 | 19.00 | 82.56 | 1.49782 | |
| 5) | −821.8595 | 0.20 | | | |
| 6) | 158.3504 | 11.50 | 82.56 | 1.49782 | |
| 7) | 579.5842 | 0.20 | | | |
| 8) | 194.6656 | 11.00 | 82.56 | 1.49782 | |
| 9) | 1705.8611 | (d9) | | | |
| 10) | −303.7329 | 2.90 | 47.38 | 1.78800 | |
| 11) | 144.5685 | 9.00 | | | |
| 12) | −316.2813 | 4.00 | 23.78 | 1.84666 | |
| 13) | −206.3012 | 2.90 | 65.47 | 1.60300 | |
| 14) | 461.6225 | (d14) | | | |
| 15) | −1259.1676 | 5.40 | 43.35 | 1.84042 | |
| 16) | −127.2577 | (d16) | | | Φ1r = 53.53 |
| 17) | −401.4289 | 1.90 | 55.52 | 1.69680 | |
| 18) | 134.8197 | 2.05 | | | |
| 19) | 662.6791 | 4.50 | 23.78 | 1.84666 | |
| 20) | −77.1176 | 1.90 | 60.09 | 1.64000 | |
| 21) | 87.7254 | 3.94 | | | |
| 22) | −60.1053 | 1.90 | 60.09 | 1.64000 | |
| 23) | −205.3204 | (d23) | | | |
| 24) | 345.5976 | 3.50 | 65.47 | 1.60300 | |
| 25) | −345.5976 | 0.50 | | | |
| 26) | 971.0425 | 6.00 | 65.47 | 1.60300 | |
| 27) | −45.2978 | 1.90 | 28.55 | 1.79504 | |
| 28) | −87.2469 | (d28) | | | |
| 29> | 0.0000 | 1.00 | | | Aperture Stop S1 |
| 30) | 118.1376 | 2.00 | 33.89 | 1.80384 | Φ4f = 37.55 |
| 31) | 73.2281 | 4.50 | 65.47 | 1.60300 | |
| 32) | −646.0891 | 0.10 | | | |
| 33) | 65.4667 | 4.00 | 65.47 | 1.60300 | |
| 34) | 159.6390 | 22.00 | | | |
| 35) | 0.0000 | 2.44 | | | Field Stop S2 |
| 36) | 440.2160 | 3.30 | 23.78 | 1.84666 | Φ4m = 26.96 |
| 37) | −72.1920 | 1.60 | 52.67 | 1.74100 | |
| 38) | 57.1210 | 4.50 | | | |
| 39) | −462.2740 | 1.60 | 52.67 | 1.74100 | |
| 40) | 110.5610 | 4.66 | | | |
| 41) | 302.8573 | 4.00 | 82.56 | 1.49782 | |
| 42) | −90.4568 | 0.10 | | | |
| 43) | 67.4726 | 6.50 | 60.09 | 1.64000 | |

TABLE 3-continued

| 44) | −67.4726 | 1.70 | 23.78 | 1.84666 |
|---|---|---|---|---|
| 45) | 508.2043 | 3.00 | | |
| 46) | 0.0000 | 2.00 | 64.12 | 1.51680 |
| 47) | 0.0000 | Bf | | |

(Variable distance upon focusing and zooming)

| | Wide-angle | Middle | Telephoto |
|---|---|---|---|
| <Focusing at infinity> | | | |
| F | 204.0000 | 300.0000 | 392.0000 |
| D0 | ∞ | ∞ | ∞ |
| d9 | 72.98056 | 72.98056 | 72.98056 |
| d14 | 28.12323 | 28.12323 | 28.12323 |
| d16 | 6.67272 | 48.23853 | 69.05568 |
| d23 | 24.24142 | 13.66375 | 3.51157 |
| d28 | 44.83193 | 13.84380 | 3.17881 |
| Bf | 85.01905 | 85.01904 | 85.01906 |
| <Focusing at closest distance> | | | |
| β | −0.15011 | −0.22075 | −0.28845 |
| D0 | 1564.4436 | 1564.4436 | 1564.4436 |
| d9 | 99.07534 | 99.07534 | 99.07534 |
| d14 | 2.02845 | 2.02845 | 2.02845 |
| d16 | 6.67272 | 48.23853 | 69.05568 |
| d23 | 24.24142 | 13.66375 | 3.51157 |
| d28 | 44.83193 | 13.84380 | 3.17881 |
| Bf | 85.01905 | 85.01905 | 85.01907 |

(Moving Amount for Vibration reduction correction)
<Focusing at infinity>

| F | 204.0000 | 300.0000 | 392.0000 |
|---|---|---|---|
| G4m | 1.000 | 1.000 | 1.000 |
| I (Image Plane) | −1.724 | −1.724 | −1.724 |
| <Focusing at closest distance> | | | |
| β | −0.15011 | −0.22075 | −0.28845 |
| G4m | 1.000 | 1.000 | 1.000 |
| I (Image Plane) | −1.724 | −1.724 | −1.724 |

Figure 16:
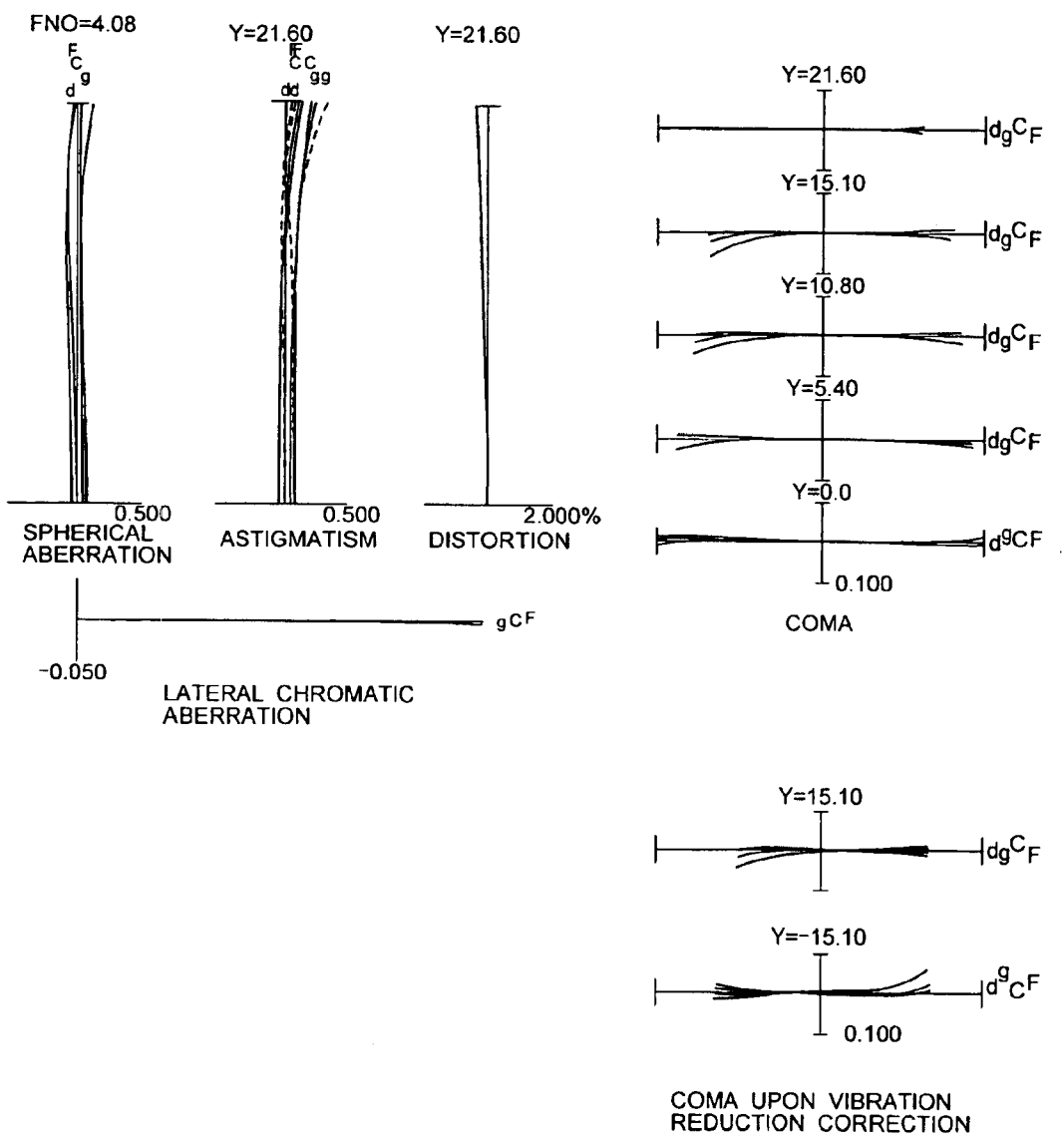
FIG. 16 graphically shows various aberrations of the zoom lens system according to Example 3 in a wide-angle end state when the system is focused at infinity.
Figure 17:
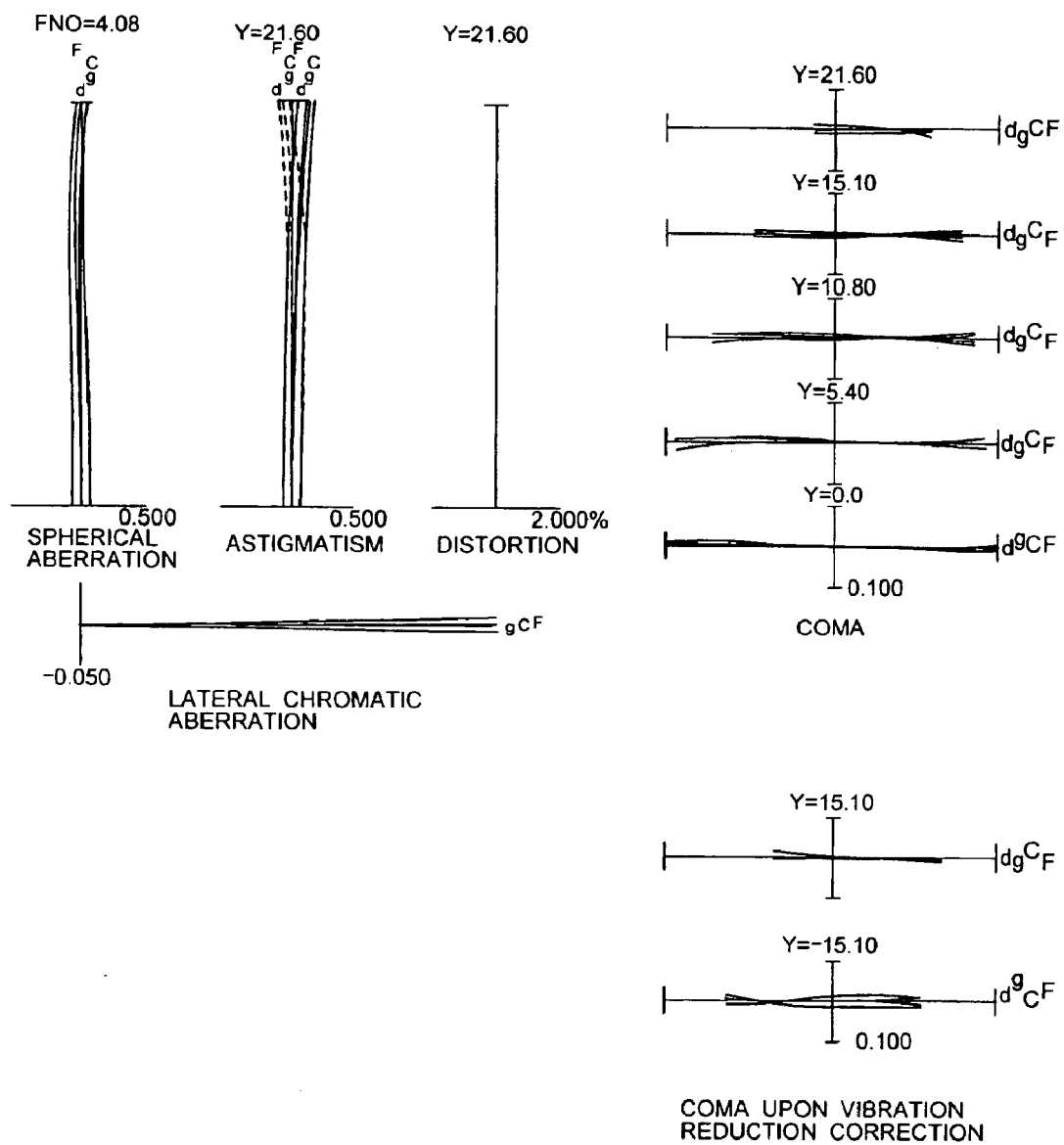
FIG. 17 graphically shows various aberrations of the zoom lens system according to Example 3 in an intermediate focal length state when the system is focused at infinity.
Figure 18:
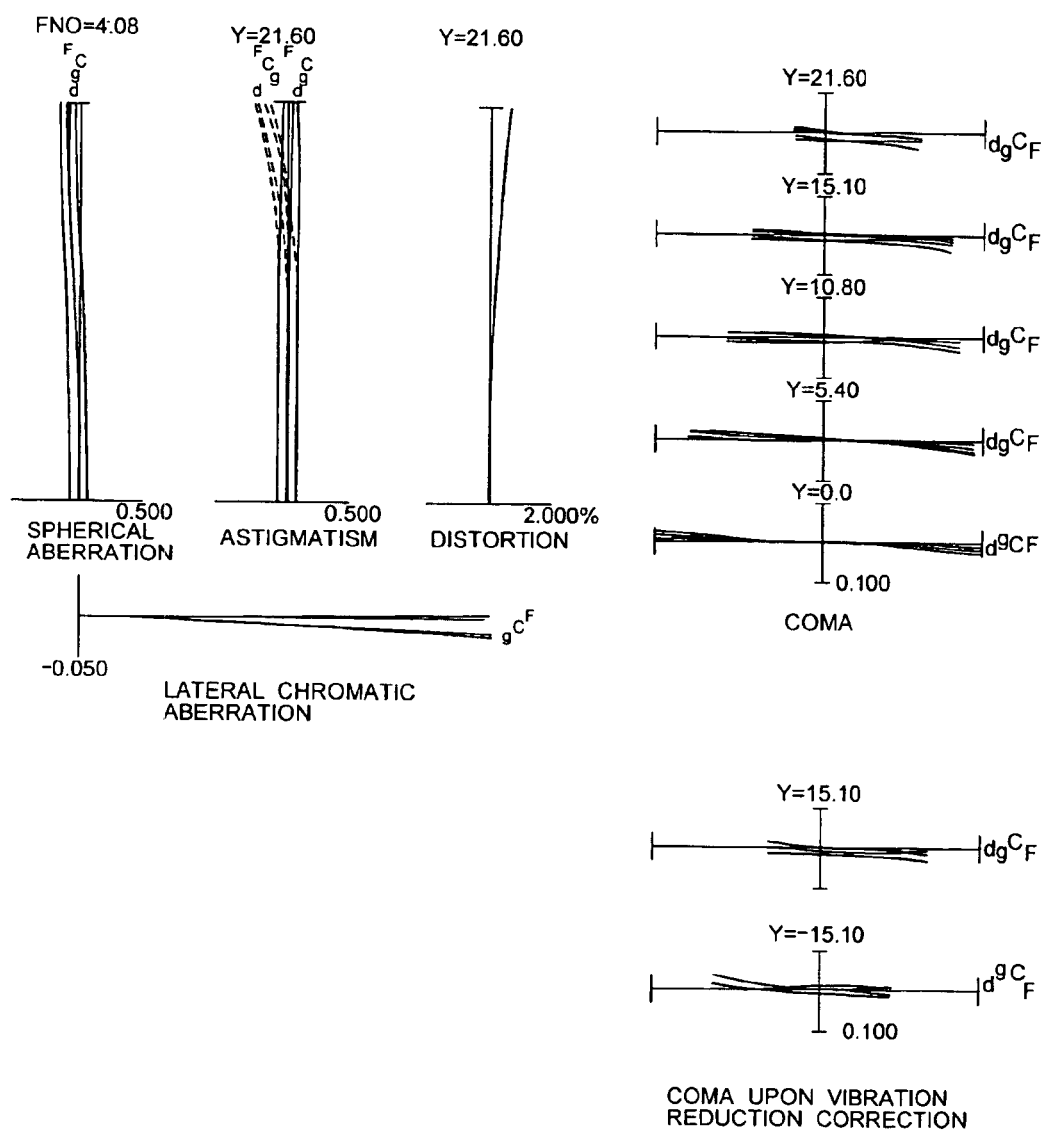
FIG. 18 graphically shows various aberrations of the zoom lens system according to Example 3 in a telephoto end state when the system is focused at infinity.
Figure 19:
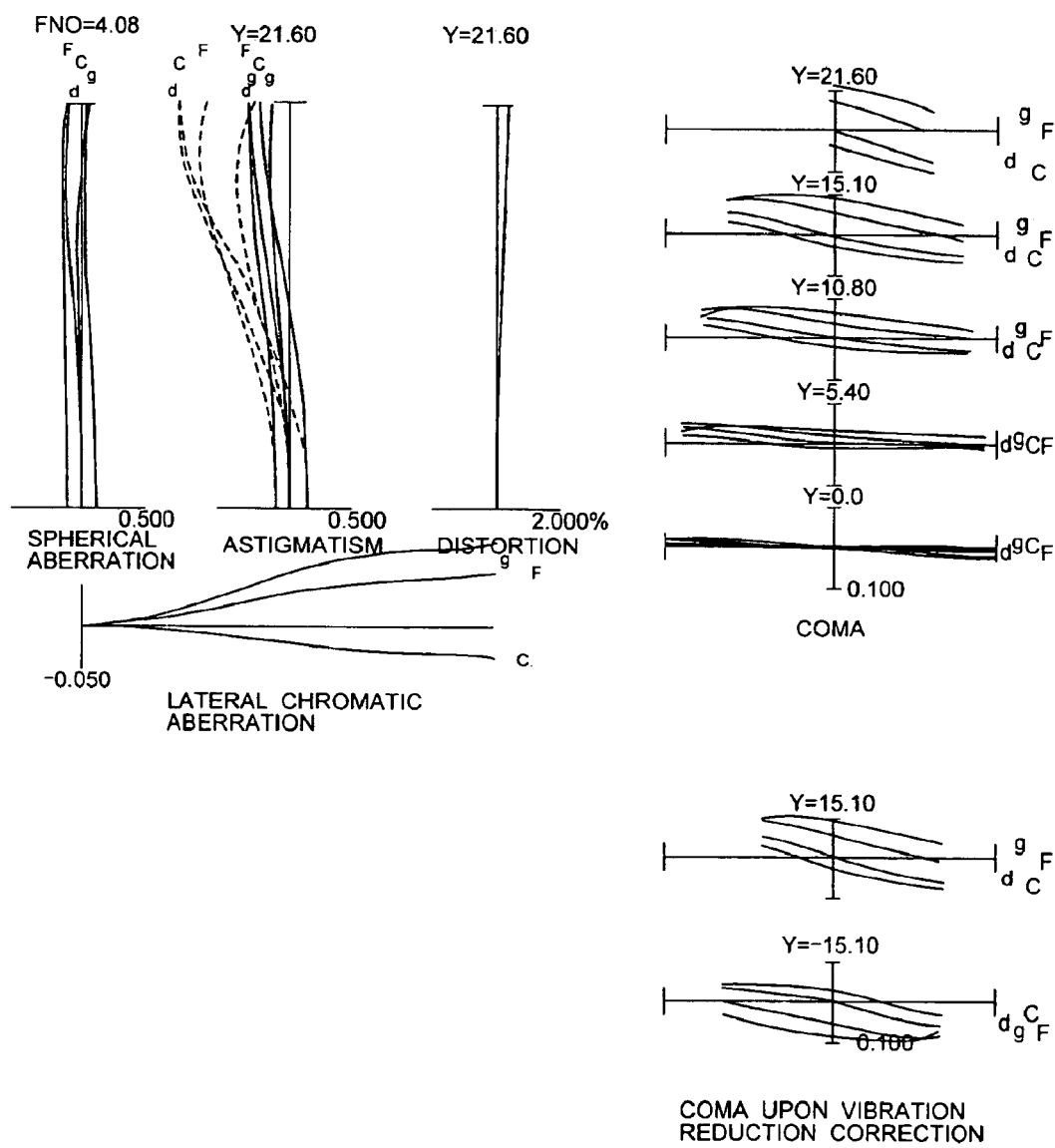
FIG. 19 graphically shows various aberrations of the zoom lens system according to Example 3 in the wide-angle end state when the system is focused at the closest focusing distance.
Figure 20:
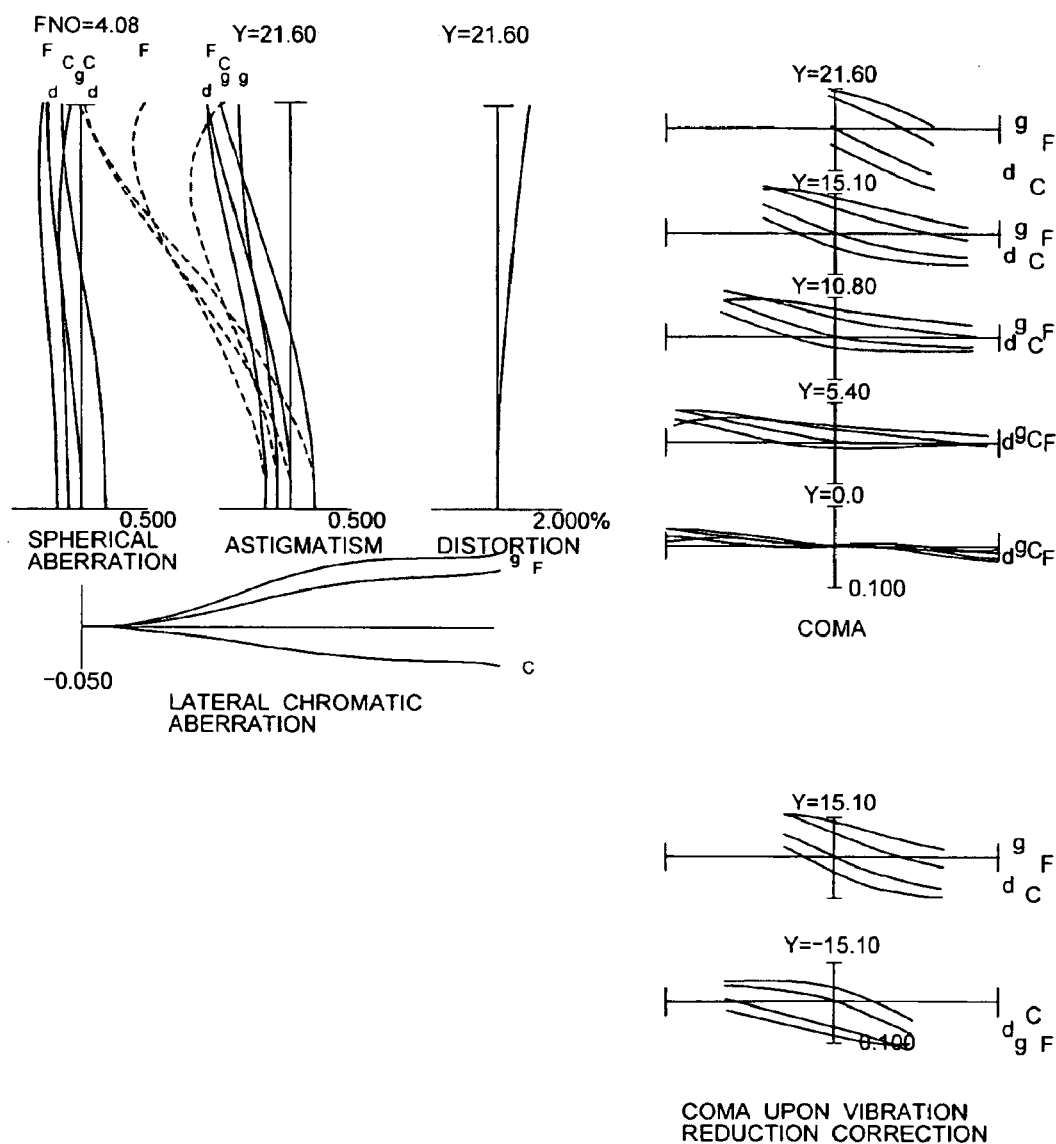
FIG. 20 graphically shows various aberrations of the zoom lens system according to Example 3 in the intermediate focal length state when the system is focused at the closest focusing distance.
Figure 21:
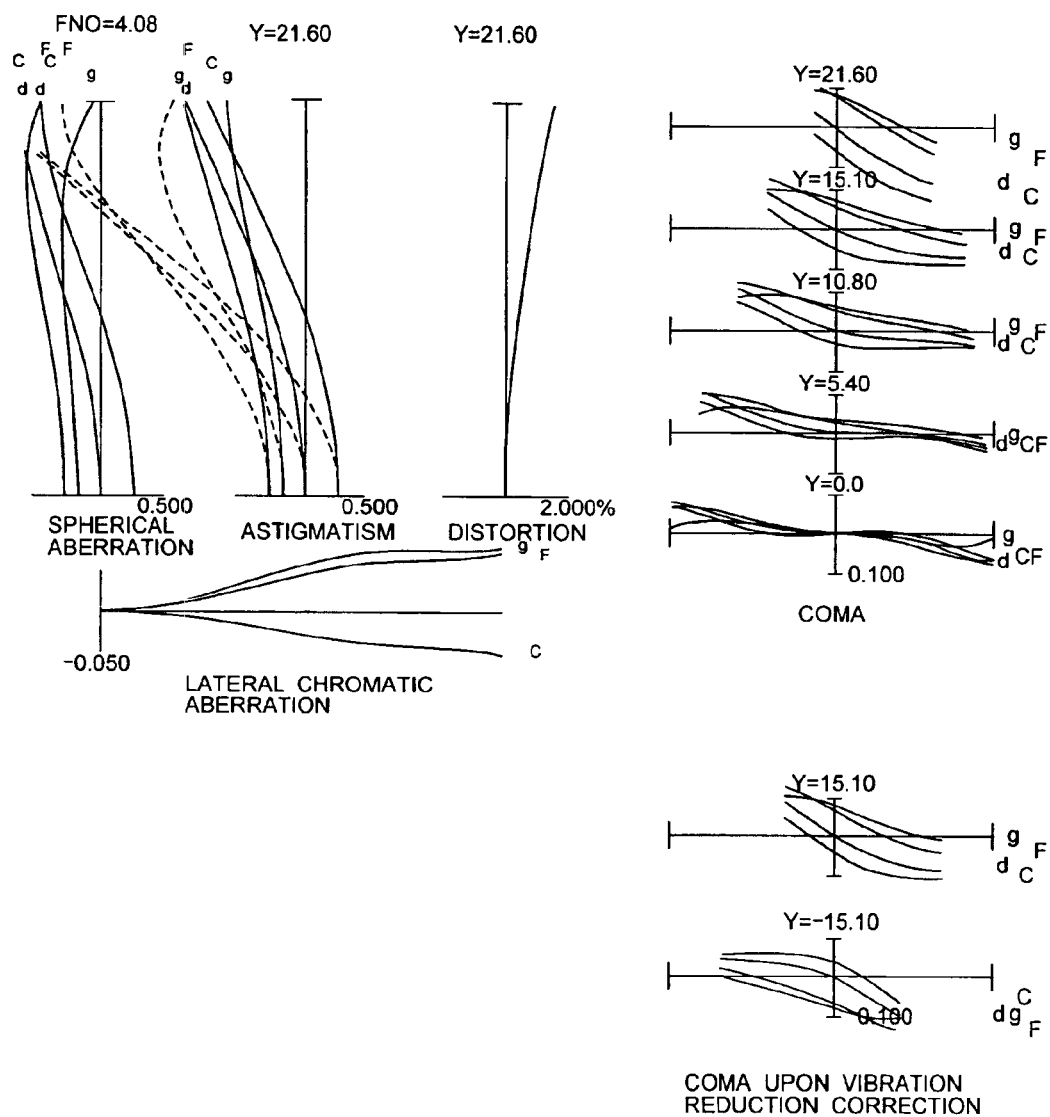
FIG. 21 graphically shows various aberrations of the zoom lens system according to Example 3 in the telephoto end state when the system is focused at the closest focusing distance.

FIGS. 16, 17, 18 graphically show various aberrations of the zoom lens system according to Example 3 in the wide-angle end state, the intermediate focal length state, and the telephoto end state, respectively, when the system is focused at infinity. FIGS. 19, 20, 21 graphically show various aberrations of the zoom lens system in the wide-angle end state, the intermediate focal length state, and the telephoto end state, respectively, when the system is focused at the closest focusing distance (R=2000 mm).

As is apparent from the respective graphs showing various aberrations, excellent compensation is made for various aberrations upon operating vibration reduction correction as well as common use.

By the way, a plane parallel grass FFL for protection may be placed to the object side of the lens element L11 as shown in Example 3.

Values for conditional expressions are listed all together in Table 4.

TABLE 4

| | Example 1 | Example 2 | Example 3 |
|---|---|---|---|
| (1): | (F1f × F1r234t)/(F1m × Φ1) | | 3.491 | 4.618 | 3.127 |
| (2): | (F1f × F4)/(F1mr23t × Φ1) | | 3.853 | 4.050 | 3.112 |
| (3): | (F1 × F4)/(F23t × Φ1) | | 3.844 | 4.035 | 3.117 |
| (4): | (F1f × F1r × F4)/(F1m × F23t × Φ1) | | 3.844 | 3.745 | 3.005 |
| (5): | (F4 × F4m)/(F4f × F4r) | | 1.066 | 1.120 | 1.036 |
| (6): | (Ft × Φ4f)/(F4 × Φ1 × Φ4m) | | 0.031 | 0.029 | 0.028 |

TABLE 4-continued

|  | Example 1 | Example 2 | Example 3 |
|---|---|---|---|
| (7): \|(F1 × Φ4f)/(F23t × Φ1 × Φ4m)\| | 0.031 | 0.029 | 0.028 |
| (8): \|(F1f × Φ1r)/(F1m × Φ1 × Φ4m)\| | 0.033 | 0.027 | 0.063 |
| (9): \|(F1r × Φ4f)/(F23t × Φ1r × Φ4m)\| | 0.032 | 0.029 | 0.030 |
| (10): 1/(Nd1r × F1r) | 0.0033 | 0.0037 | 0.0032 |
| (11): 1/(NdL11 × FL11) | −0.0023 | −0.0028 | −0.0017 |

As described above the present invention makes it possible to provide a large aperture internal focusing telephoto zoom lens system having the FNO of about 4 or less capable of being used as a vibration reduction correction lens with keeping superior optical performance.

Moreover, the present invention makes it possible to provide a large aperture, internal focusing, telephoto zoom lens system having the focal length in the telephoto end state of 300 mm or more, and the zoom ratio of 1.7 or more, making the effective diameter of the lens system corresponding to the hand held portion as narrow as possible for keeping good portability.

Furthermore, in the present invention, since focusing lens group, zooming lens group, and vibration reduction correction lens group are independent with each other, mechanical construction can be relatively simple, so that it is easy to make the structure tolerant of vibration or an impact of a fall. Here, if you do not mind that the outer diameter of the lens barrel becomes large, it is possible to carry out vibration reduction correction with the front lens group of the fourth lens group. In Examples 1 and 2 also, a filter may be applied to the object side of the most object side lens of the front lens group of the first lens group.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system consisting of, in order from an object:

a first lens group having positive refractive power;
a second lens group having negative refractive power;
a third lens group having positive refractive power; and
a fourth lens group having positive refractive power;
zooming being carried out by moving the second lens group and the third lens group along the optical axis;
the first lens group consisting of, in order from the object,
a front lens group of the first lens group having positive refractive power;
a middle lens group of the first lens group having negative refractive power; and
a rear lens group of the first lens group having positive refractive power;
in the fourth lens group, there being three lens portions with refractive power that are, in order from the object;
a front lens group of the fourth lens group having positive refractive power;
a middle lens group of the fourth lens group having negative refractive power; and
a rear lens group of the fourth lens group having positive refractive power;
the front lens group of the first lens group comprising two positive lens elements and a negative lens element;
the middle lens group of the first lens group comprising a positive element and a negative lens element;
the rear lens group of the first lens group comprising a positive lens element;
focusing to a close object being carried out by moving the middle lens group of the first lens group along the optical axis;
the front lens group of the fourth lens group comprising a positive element and a negative lens element;
the middle lens group of the fourth lens group comprising a positive element and two negative lens elements;
the rear lens group of the fourth lens group comprising a positive lens element and a negative lens element;
imaging position being varied by shifting the middle lens group of the fourth lens group perpendicularly to the optical axis; and
the following conditional expression being satisfied:

$$2.5 < |(F1f \times F1r234t)/(F1m \times \Phi1)| < 5.0$$

where $\Phi1$ denotes the maximum effective diameter of the first lens group, F1f denotes the focal length of the front lens group of the first lens group, F1m denotes the focal length of the middle lens group of the first lens group, F1r234t denotes the combined focal length of the rear lens group of the first lens group, the second lens group, the third lens group, and the fourth lens group in the telephoto end state.

2. The zoom lens system according to claim 1, wherein the following conditional expressions are satisfied:

$$2.5 < |(F1f \times F4)/(F1mr23t \times \Phi1)| < 5.0$$

$$2.5 < |(F1 \times F4)/(F23t \times \Phi1)| < 5.0$$

$$2.5 < |(F1f \times F1r \times F4)/(F1m \times F23t \times \Phi1)| < 5.0$$

$$0.7 < |(F4 \times F4m)/(F4f \times F4r)| < 1.3$$

where F1 denotes the focal length of the first lens group, F23t denotes the combined focal length of the second lens group and the third lens group in the telephoto end state, F4 denotes the focal length of the fourth lens group, F1r denotes the focal length of the rear lens group of the first lens group, F1mr23t denotes the combined focal length of the middle lens group of the first lens group, the rear lens group of the first lens group, the second lens group and the third lens group in the telephoto end state, F4f denotes the focal length of the front lens group of the fourth lens group, F4m denotes the focal length of the middle lens group of the fourth lens group, and F4r denotes the focal length of the rear lens group of the fourth lens group.

3. The zoom lens system according to claim 2, wherein the following conditional expressions are satisfied:

$$0.025 < |(Ft \times \Phi4f)/(F4 \times \Phi1 \times \Phi4m)| < 0.045$$

$$0.025 < |(F1 \times \Phi4f)/(F23t \times \Phi1 \times \Phi4m)| < 0.045$$

$$0.020 < |(F1f \times \Phi1r)/(F1m \times \Phi1 \times \Phi4m)| < 0.070$$

$$0.025 < |(F1r \times \Phi4f)/(F23t \times \Phi1 \times \Phi4m)| < 0.045$$

where Ft denotes the focal length of the zoom lens system in the telephoto end state, $\Phi1r$ denotes the maximum effective diameter of the rear lens group of the first lens group G1r, $\Phi4f$ denotes the maximum effective diameter of the front lens group of the fourth lens group G4f, and $\Phi4m$ denotes the maximum effective diameter of the middle lens group of the fourth lens group G4m.

4. The zoom lens system according to claim 3, wherein the following conditional expression is satisfied:

$$0.0031 < 1/(Nd1r \times F1r) < 0.0039$$

where Nd1r denotes average refractive index of the lens elements in the rear lens group of the first lens group at d-line.

5. The zoom lens system according to claim 4, wherein the most object side lens in the front lens group of the first lens group is a negative meniscus lens having a convex surface facing to the object, and the following conditional expression is satisfied:

$$-0.0060 < 1/(NdL11 \times FL11) < -0.00050$$

where FL11 and NdL11 denote the focal length and refractive index at d-line of the negative meniscus lens, respectively.

6. The zoom lens system according to claim 5, wherein the front lens group of the fourth lens group consists of two positive lens elements and a negative lens element, and the rear lens group of the fourth lens group consists of two positive lens elements and a negative lens element.

7. The zoom lens system according to claim 3, wherein the most object side lens in the front lens group of the first lens group is a negative meniscus lens having a convex surface facing to the object, and the following conditional expression is satisfied:

$$-0.0060 < 1/(NdL11 \times FL11) < -0.00050$$

where FL11 and NdL11 denote the focal length and refractive index at d-line of the negative meniscus lens, respectively.

8. The zoom lens system according to claim 2, wherein the following conditional expression is satisfied:

$$0.0031 < 1/(Nd1r \times F1r) < 0.0039$$

where Nd1r denotes average refractive index of the lens elements in the rear lens group of the first lens group at d-line.

9. The zoom lens system according to claim 8, wherein the most object side lens in the front lens group of the first lens group is a negative meniscus lens having a convex surface facing to the object, and the following conditional expression is satisfied:

$$-0.0060 < 1/(NdL11 \times FL11) < -0.00050$$

where FL11 and NdL11 denote the focal length and refractive index at d-line of the negative meniscus lens, respectively.

10. The zoom lens system according to claim 2, wherein the most object side lens in the front lens group of the first lens group is a negative meniscus lens having a convex surface facing to the object, and the following conditional expression is satisfied:

$$-0.0060 < 1/(NdL11 \times FL11) < -0.00050$$

where FL11 and NdL11 denote the focal length and refractive index at d-line of the negative meniscus lens, respectively.

11. The zoom lens system according to claim 2, wherein the front lens group of the fourth lens group consists of two positive lens elements and a negative lens element, and the rear lens group of the fourth lens group consists of two positive lens elements and a negative lens element.

12. The zoom lens system according to claim 1, wherein the following conditional expressions are satisfied:

$$0.025 < |(Ft \times \Phi 4f)/(F4 \times \Phi 1 \times \Phi 4m)| < 0.045$$

$$0.025 < |(F1 \times \Phi 4f)/(F23t \times \Phi 1 \times \Phi 4m)| < 0.045$$

$$0.020 < |(F1f \times \Phi 1r)/(F1m \times \Phi 1 \times \Phi 4m)| < 0.070$$

$$0.025 < |(F1r \times \Phi 4f)/(F23t \times \Phi 1r \times \Phi 4m)| < 0.045$$

where Ft denotes the focal length of the zoom lens system in the telephoto end state, $\Phi 1r$ denotes the maximum effective diameter of the rear lens group of the first lens group G1r, $\Phi 4f$ denotes the maximum effective diameter of the front lens group of the fourth lens group G4f, and $\Phi 4m$ denotes the maximum effective diameter of the middle lens group of the fourth lens group G4m.

13. The zoom lens system according to claim 12, wherein the following conditional expression is satisfied:

$$0.0031 < 1/(Nd1r \times F1r) < 0.0039$$

where Nd1r denotes average refractive index of the lens elements in the rear lens group of the first lens group at d-line.

14. The zoom lens system according to claim 13, wherein the most object side lens in the front lens group of the first lens group is a negative meniscus lens having a convex surface facing to the object, and the following conditional expression is satisfied:

$$-0.0060 < 1/(NdL11 \times FL11) < -0.00050$$

where FL11 and NdL11 denote the focal length and refractive index at d-line of the negative meniscus lens, respectively.

15. The zoom lens system according to claim 12, wherein the most object side lens in the front lens group of the first lens group is a negative meniscus lens having a convex surface facing to the object, and the following conditional expression is satisfied:

$$-0.0060 < 1/(NdL11 \times FL11) < -0.00050$$

where FL11 and NdL11 denote the focal length and refractive index at d-line of the negative meniscus lens, respectively.

16. The zoom lens system according to claim 12, wherein the front lens group of the fourth lens group consists of two positive lens elements and a negative lens element, and the rear lens group of the fourth lens group consists of two positive lens elements and a negative lens element.

17. The zoom lens system according to claim 1, wherein the following conditional expression is satisfied:

$$0.0031 < 1/(Nd1r \times F1r) < 0.0039$$

where Nd1r denotes average refractive index of the lens elements in the rear lens group of the first lens group at d-line.

18. The zoom lens system according to claim 17, wherein the most object side lens in the front lens group of the first lens group is a negative meniscus lens having a convex surface facing to the object, and the following conditional expression is satisfied:

$$-0.0060 < 1/(NdL11 \times FL11) < -0.00050$$

where FL11 and NdL11 denote the focal length and refractive index at d-line of the negative meniscus lens, respectively.

19. The zoom lens system according to claim 1, wherein the most object side lens in the front lens group of the first lens group is a negative meniscus lens having a convex surface facing to the object, and the following conditional expression is satisfied:

$$-0.0060 < 1/(NdL11 \times FL11) < -0.00050$$

where FL11 and NdL11 denote the focal length and refractive index at d-line of the negative meniscus lens, respectively.

20. The zoom lens system according to claim 1, wherein the front lens group of the fourth lens group consists of two positive lens elements and a negative lens element, and the rear lens group of the fourth lens group consists of two positive lens elements and a negative lens element.

21. The zoom lens system according to claim 1, wherein a field stop is arranged between the front lens group of the fourth lens group and the middle lens group of the fourth lens group.

* * * * *